(12) United States Patent
Nishiike et al.

(10) Patent No.: US 7,753,156 B2
(45) Date of Patent: Jul. 13, 2010

(54) CONTROL SYSTEM AND VEHICLE INCLUDING THE SAME

(75) Inventors: Yoshinobu Nishiike, Shizuoka (JP); Yoshitaka Nishiike, legal representative, Shiga (JP); Hiroto Watanabe, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 395 days.

(21) Appl. No.: 11/867,894

(22) Filed: Oct. 5, 2007

(65) Prior Publication Data
US 2008/0105479 A1    May 8, 2008

(30) Foreign Application Priority Data
Oct. 6, 2006    (JP) ............... 2006-275622

(51) Int. Cl.
B60K 28/16    (2006.01)
(52) U.S. Cl. ......................... 180/197; 701/41
(58) Field of Classification Search ................. 180/197; 701/41
See application file for complete search history.

(56) References Cited

U.S. PATENT DOCUMENTS

| | | | |
|---|---|---|---|
| 4,554,990 A | | 11/1985 | Kamiya et al. |
| 5,406,486 A | * | 4/1995 | Kamio et al. ............... 701/84 |
| 5,737,714 A | | 4/1998 | Matsuno et al. |
| 5,813,936 A | | 9/1998 | Kichima et al. |
| 6,324,461 B1 | * | 11/2001 | Yamaguchi et al. ........... 701/80 |
| 2002/0032512 A1 | * | 3/2002 | Shimada ....................... 701/89 |
| 2008/0105479 A1 | * | 5/2008 | Nishiike et al. ............. 180/197 |

FOREIGN PATENT DOCUMENTS

| | | |
|---|---|---|
| EP | 0 322 790 A2 | 7/1989 |
| JP | 04-072445 A | 3/1992 |
| JP | 06-081683 A | 3/1994 |
| JP | 07-332122 A | 12/1995 |
| JP | 08-118992 A | 5/1996 |
| JP | 08-158904 A | 6/1996 |
| JP | 09-249050 A | 9/1997 |
| JP | 2000-344083 A | 12/2000 |
| JP | 2001-214774 A | 8/2001 |

OTHER PUBLICATIONS

Official communication issued in counterpart European Application No. 07019655.5, mailed Jan. 21, 2008.

* cited by examiner

Primary Examiner—Lesley Morris
Assistant Examiner—Tashiana Adams
(74) Attorney, Agent, or Firm—Keating & Bennett, LLP

(57) ABSTRACT

A control system for a vehicle includes an ECU, a front wheel speed sensor, a rear wheel speed sensor, and an engine. The ECU detects an actual slip speed and an actual slip ratio of a rear wheel on the basis of respective detected values of a front wheel speed sensor and a rear wheel speed sensor. Slip speed traction control is started when the actual slip speed exceeds a threshold value of a slip speed when a vehicle is at a low speed, and slip ratio traction control is started when the actual slip ratio exceeds a threshold value of a slip ratio when it is at an intermediate or high speed. An output of the engine is adjusted depending on the actual slip speed in the slip speed traction control, while being adjusted depending on the actual slip ratio in the slip ratio traction control.

13 Claims, 17 Drawing Sheets

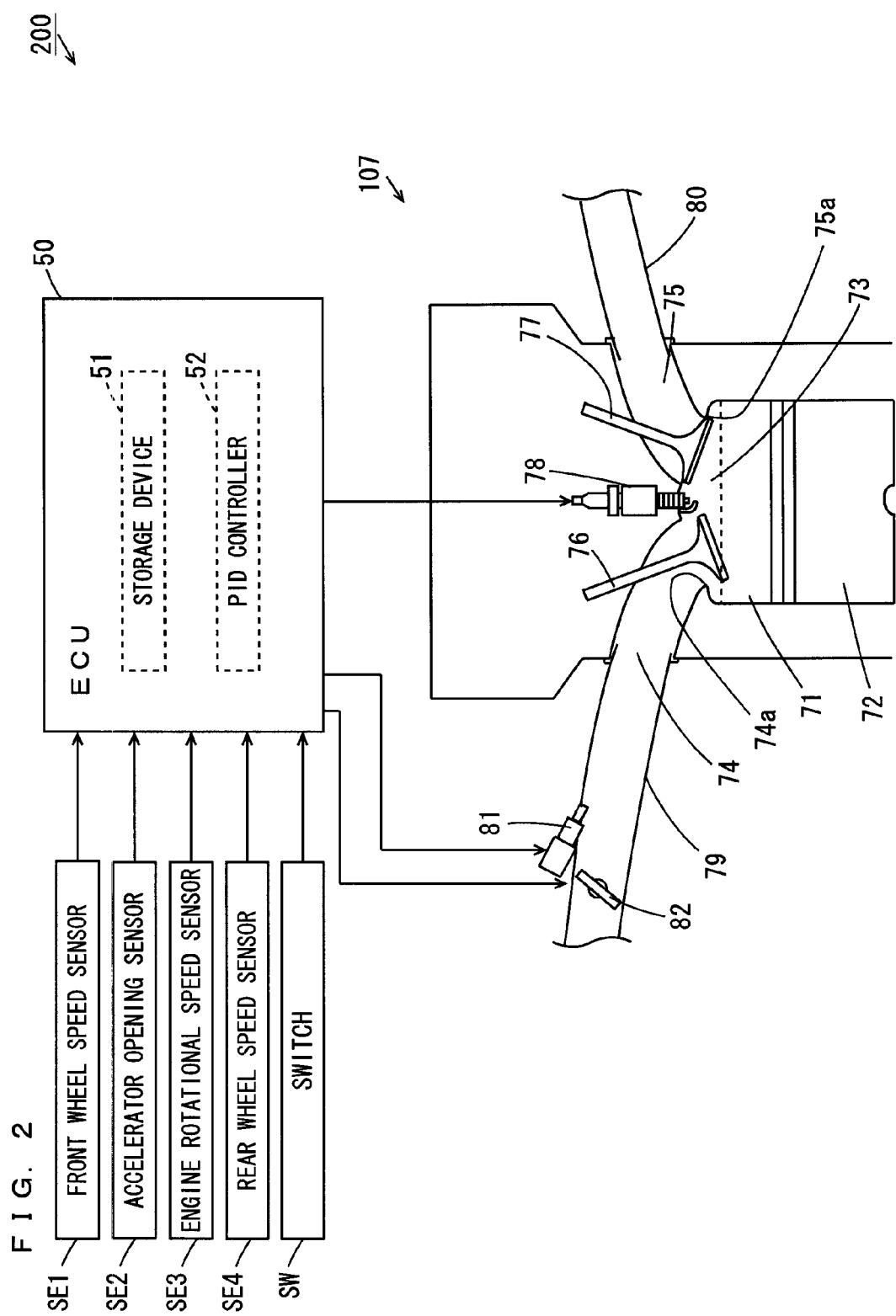

F I G. 8
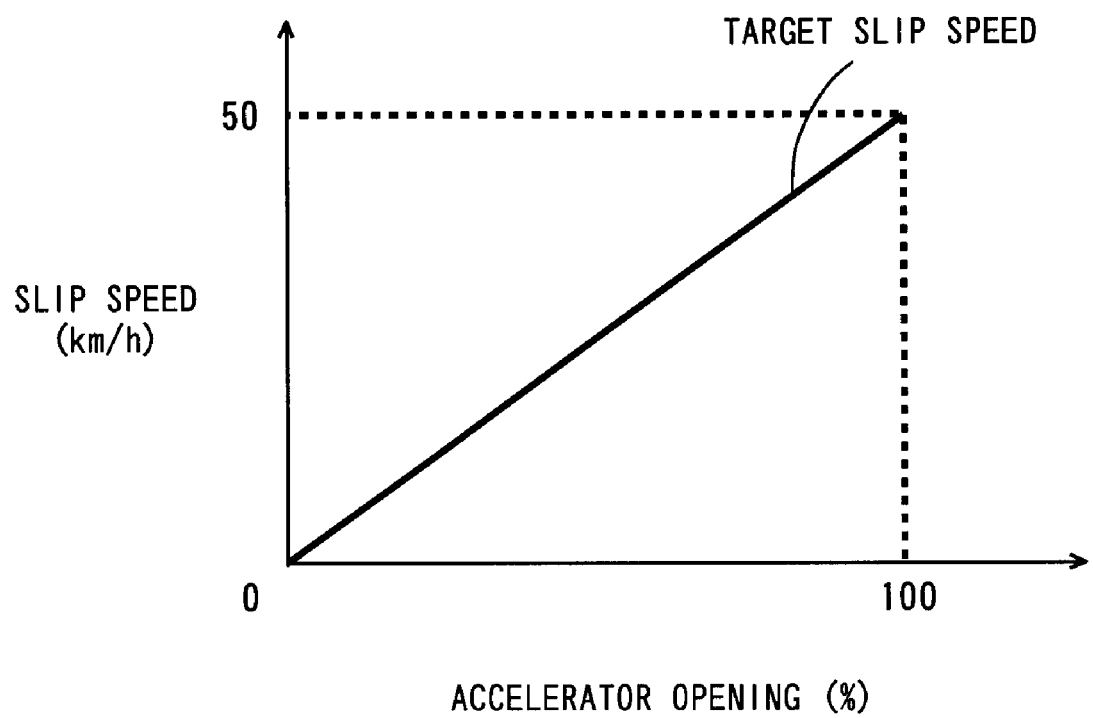

F I G. 1 0
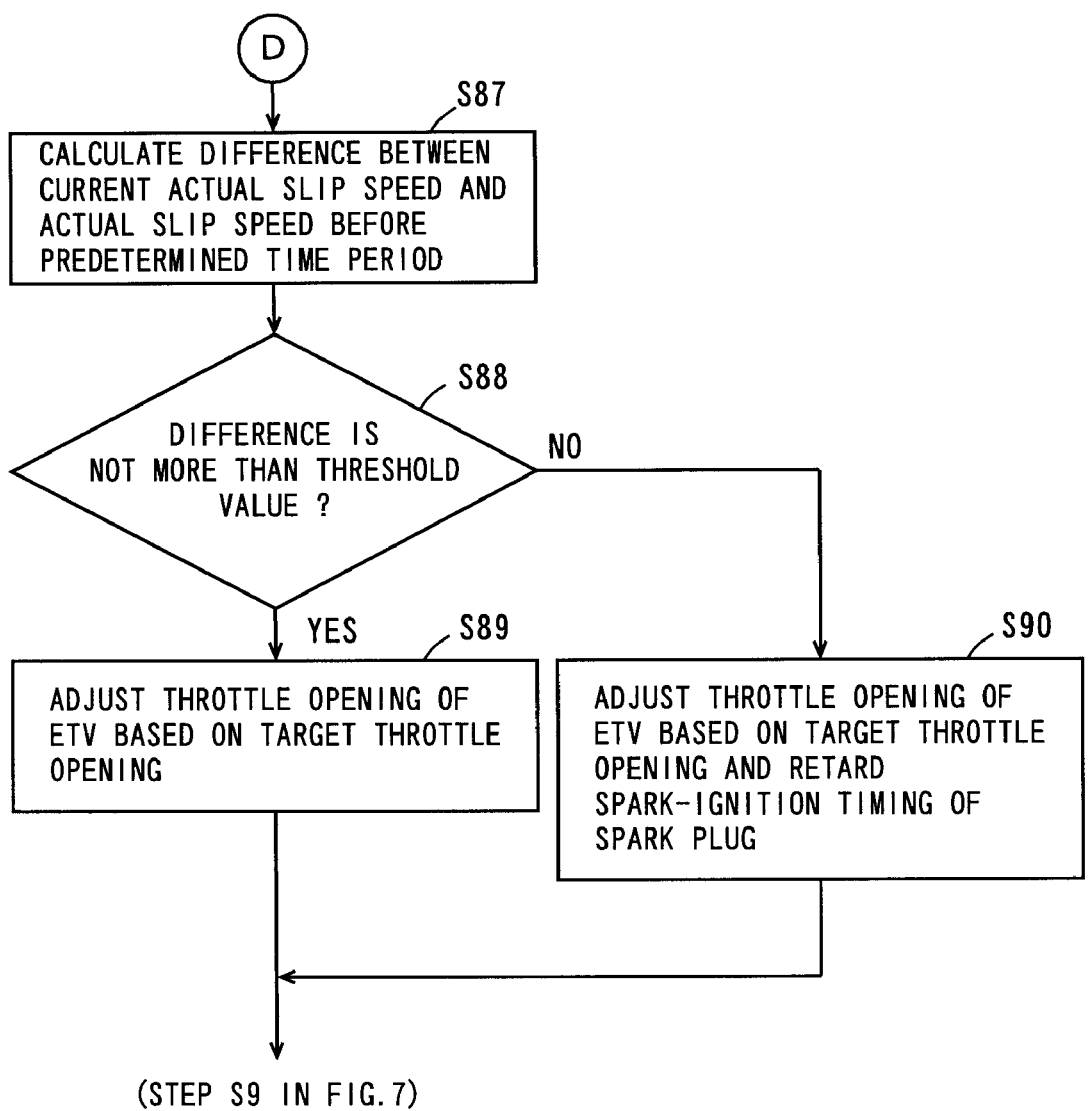

FIG. 13

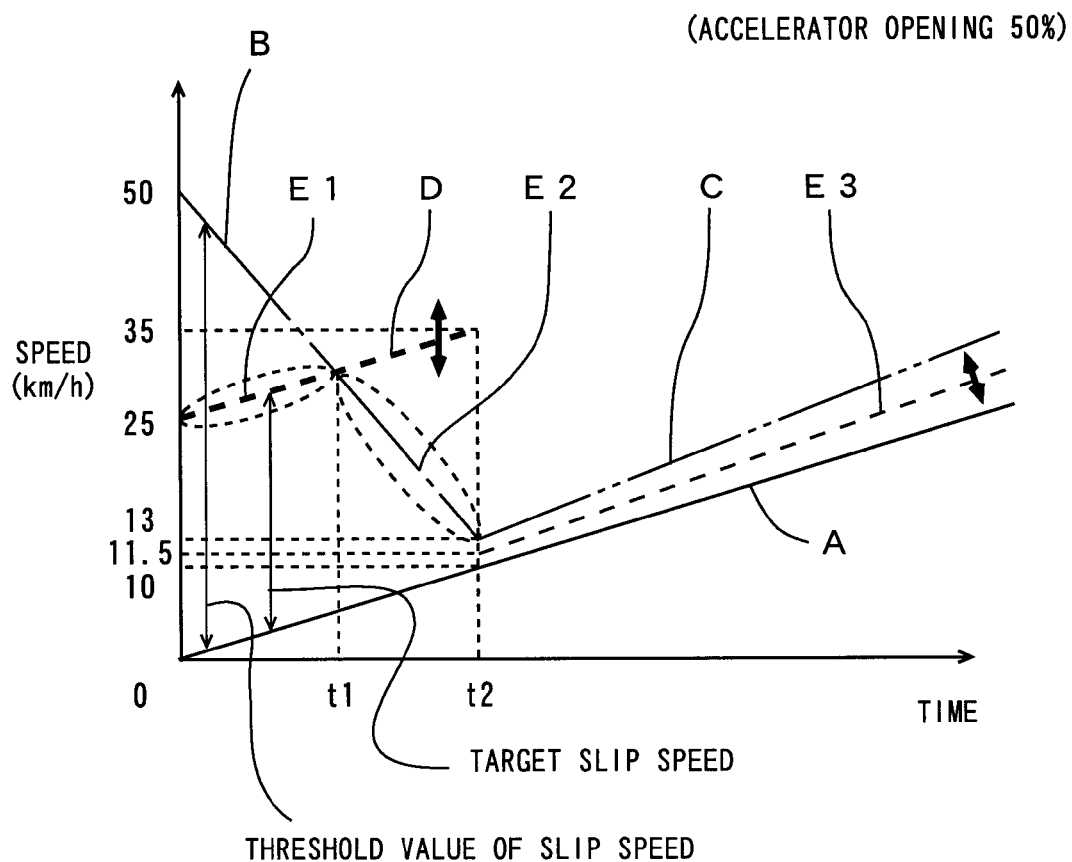

A: FRONT WHEEL SPEED (VEHICLE SPEED)
B: FIRST REAR WHEEL SPEED THRESHOLD VALUE (FRONT WHEEL SPEED
   + THRESHOLD VALUE OF SLIP SPEED)
C: SECOND REAR WHEEL SPEED THRESHOLD VALUE (FRONT WHEEL SPEED
   + FRONT WHEEL SPEED × THRESHOLD VALUE OF SLIP RATIO)
D: FRONT WHEEL SPEED + TARGET SLIP SPEED
E1: FIRST REAR WHEEL SPEED TARGET VALUE
E2: SECOND REAR WHEEL SPEED TARGET VALUE
E3: THIRD REAR WHEEL SPEED TARGET VALUE (FRONT WHEEL SPEED
    + FRONT WHEEL SPEED × TARGET SLIP RATIO)

FIG. 14

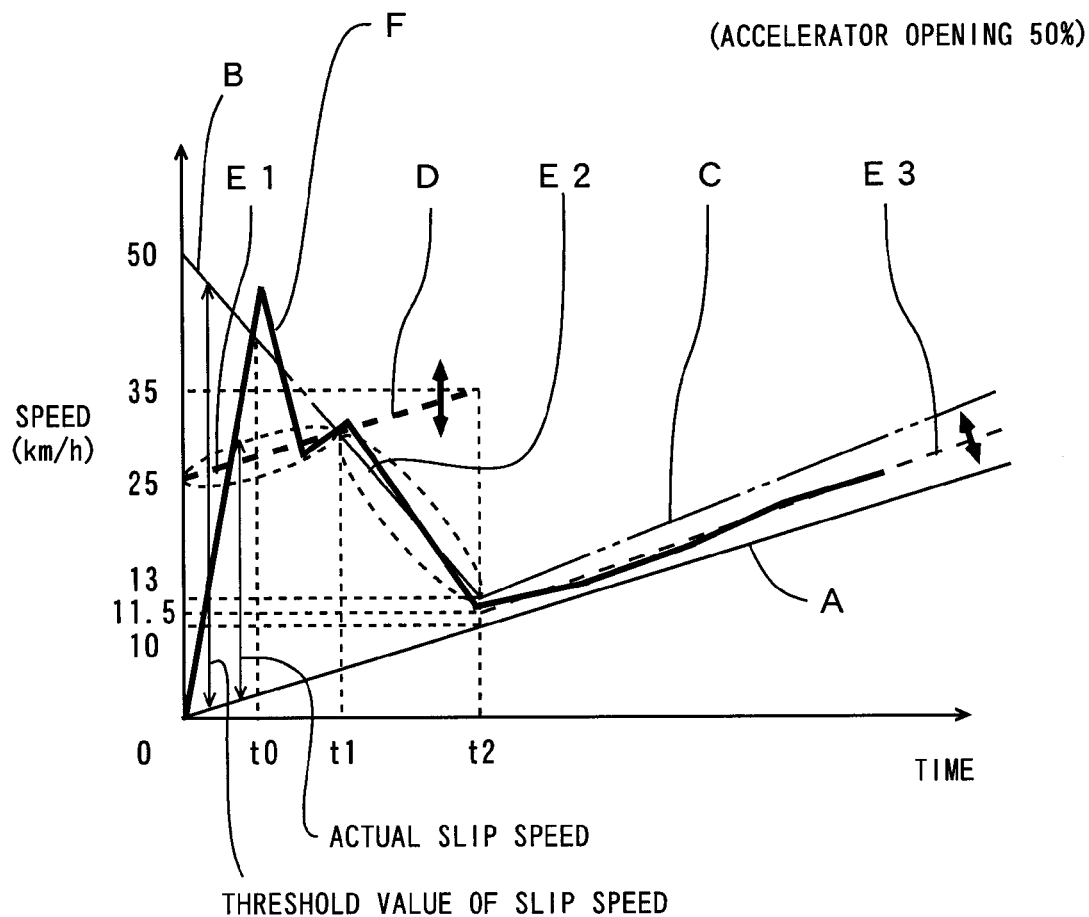

A: FRONT WHEEL SPEED (VEHICLE SPEED)
B: FIRST REAR WHEEL SPEED THRESHOLD VALUE (FRONT WHEEL SPEED
   + THRESHOLD VALUE OF SLIP SPEED)
C: SECOND REAR WHEEL SPEED THRESHOLD VALUE (FRONT WHEEL SPEED
   + FRONT WHEEL SPEED × THRESHOLD VALUE OF SLIP RATIO)
D: FRONT WHEEL SPEED + TARGET SLIP SPEED
E1: FIRST REAR WHEEL SPEED TARGET VALUE
E2: SECOND REAR WHEEL SPEED TARGET VALUE
E3: THIRD REAR WHEEL SPEED TARGET VALUE (FRONT WHEEL SPEED
    + FRONT WHEEL SPEED × TARGET SLIP RATIO)
F: REAR WHEEL SPEED

FIG. 15

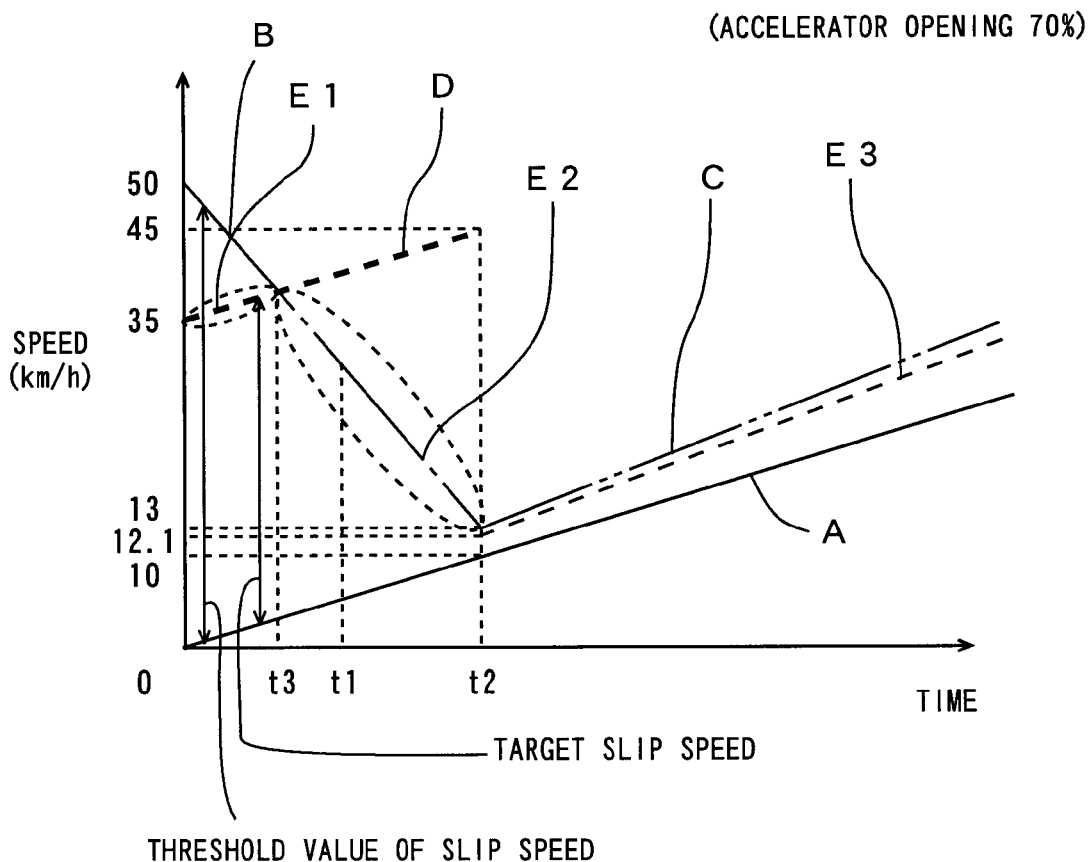

A: FRONT WHEEL SPEED (VEHICLE SPEED)
B: FIRST REAR WHEEL SPEED THRESHOLD VALUE (FRONT WHEEL SPEED
   + THRESHOLD VALUE OF SLIP SPEED)
C: SECOND REAR WHEEL SPEED THRESHOLD VALUE (FRONT WHEEL SPEED
   + FRONT WHEEL SPEED × THRESHOLD VALUE OF SLIP RATIO)
D: FRONT WHEEL SPEED + TARGET SLIP SPEED
E1: FIRST REAR WHEEL SPEED TARGET VALUE
E2: SECOND REAR WHEEL SPEED TARGET VALUE
E3: THIRD REAR WHEEL SPEED TARGET VALUE (FRONT WHEEL SPEED
    + FRONT WHEEL SPEED × TARGET SLIP RATIO)

FIG. 16

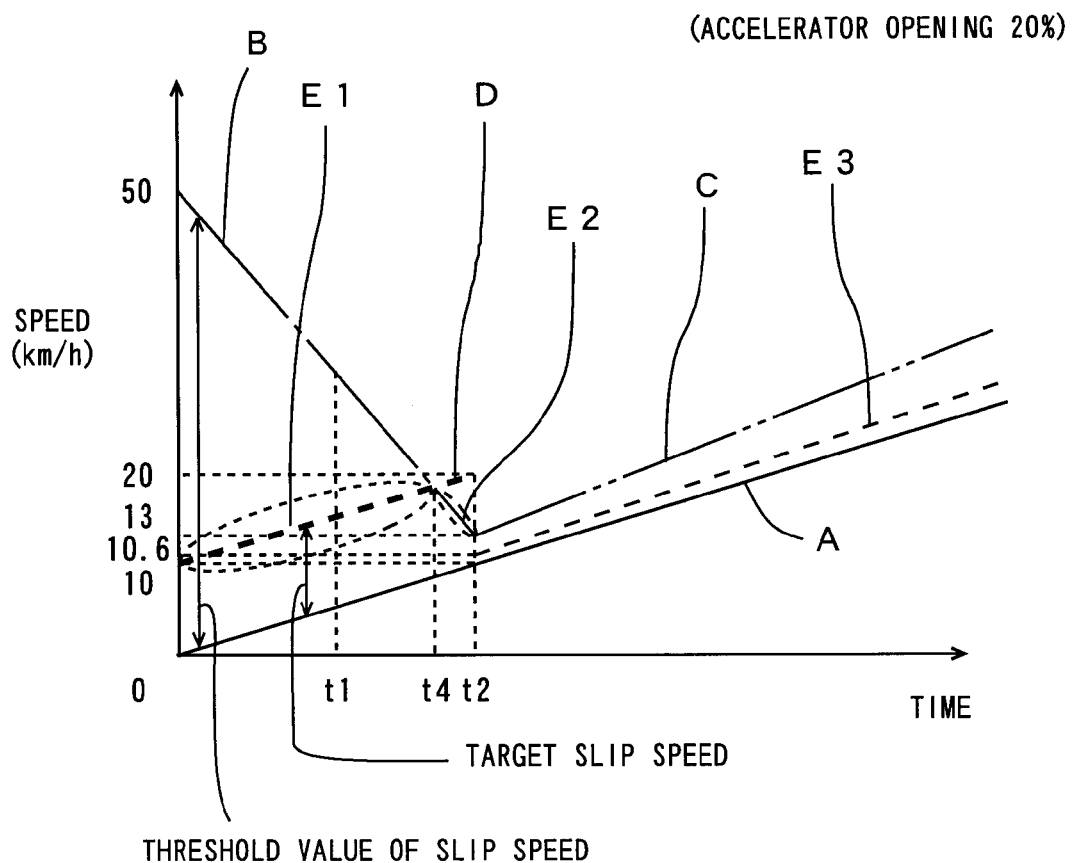

A: FRONT WHEEL SPEED (VEHICLE SPEED)
B: FIRST REAR WHEEL SPEED THRESHOLD VALUE (FRONT WHEEL SPEED + THRESHOLD VALUE OF SLIP SPEED)
C: SECOND REAR WHEEL SPEED THRESHOLD VALUE (FRONT WHEEL SPEED + FRONT WHEEL SPEED × THRESHOLD VALUE OF SLIP RATIO)
D: FRONT WHEEL SPEED + TARGET SLIP SPEED
E1: FIRST REAR WHEEL SPEED TARGET VALUE
E2: SECOND REAR WHEEL SPEED TARGET VALUE
E3: THIRD REAR WHEEL SPEED TARGET VALUE (FRONT WHEEL SPEED + FRONT WHEEL SPEED × TARGET SLIP RATIO)

TARGET SLIP SPEED DATA

TARGET SLIP RATIO DATA

F I G. 2 0
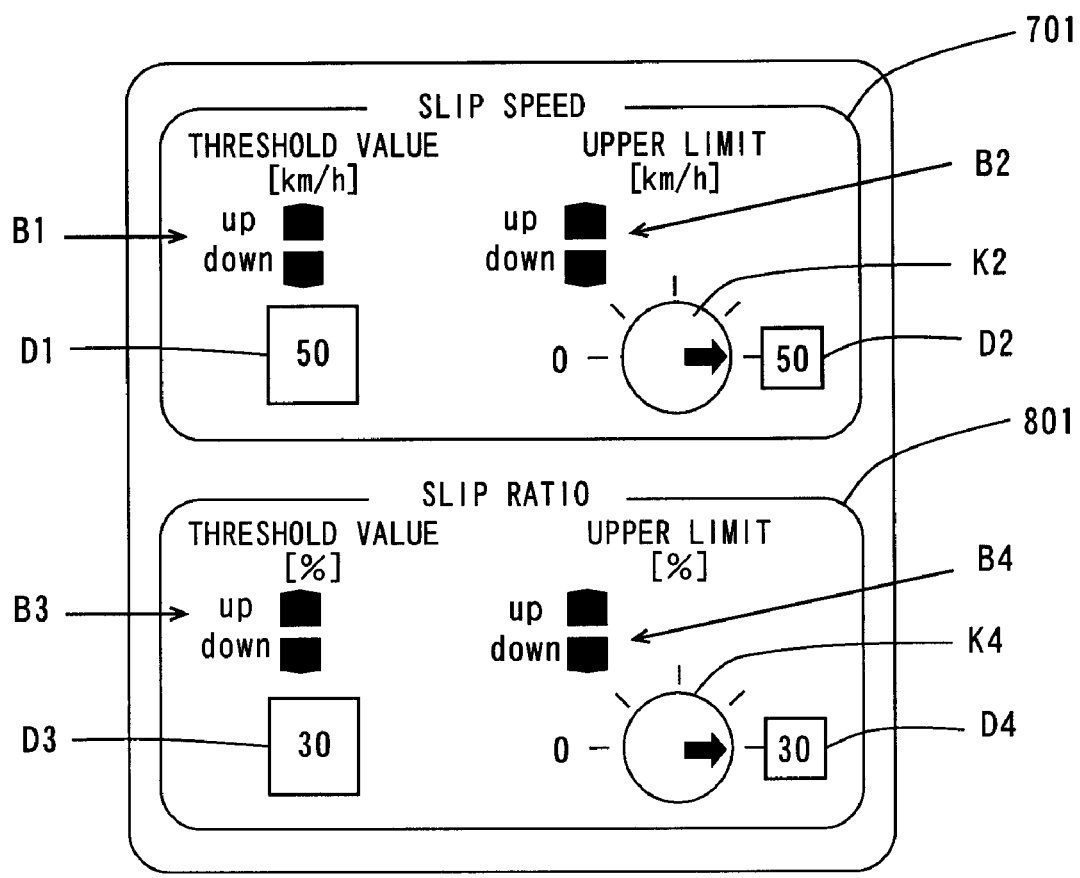

CONTROL SYSTEM AND VEHICLE INCLUDING THE SAME

BACKGROUND OF THE INVENTION

1. Field of the Invention

The present invention relates to a control system that carries out traction control of a vehicle and a vehicle including the same.

2. Description of the Related Art

As systems for preventing four-wheel motor vehicles from slipping, traction control systems (see, for example, JP 2000-344083 A and JP9-249050 A) have been conventionally developed.

In a traction control apparatus for a vehicle disclosed in JP 2000-344083 A, for example, when the amount of idling of a drive wheel exceeds an allowable slip amount, a braking force is applied to the drive wheel. Thus, the idling of the drive wheel is suppressed within the allowable slip amount.

Furthermore, in a vehicle driving force controller disclosed in JP 9-249050 A, for example, when excessive slip of a drive wheel is detected, a driving force of the vehicle is reduced such that the slip ratio of the drive wheel converges on a target slip ratio.

It is preferable that driving forces (traction) of drive wheels of vehicles are controlled depending on traveling states of the vehicles. Therefore, in JP 2000-344083 A, described above, when a sub transmission is in a low-speed state, the allowable slip amount is set to a low value. Further, in JP 9-249050 A, described above, when the shift position of an automatic transmission is forcibly changed to the second position, the target slip ratio is reduced. That is, in JP 2000-344083 A and JP 9-249050 A, traction control of the drive wheel is carried out depending on the state of the transmission.

In JP 2000-344083 A and JP 9-249050 A, however, the traction control of the drive wheel is carried out on the basis of the state of the transmission. Therefore, traction control suitable for a vehicle speed cannot, in some cases, be carried out.

SUMMARY OF THE INVENTION

In order to overcome the problems described above, preferred embodiments of the present invention provide a control system for a vehicle that can carry out traction control that is suitable for a vehicle speed and a vehicle including the same.

The inventors have considered that grip characteristics between a drive wheel of a vehicle and a road surface are greatly affected by a vehicle speed. Therefore, they have considered it preferable that when the vehicle speed is in a high-speed region, traction control of the drive wheel is carried out in consideration of the grip characteristics between the drive wheel and the road surface in the high-speed region, and have considered it preferable that when the vehicle speed is in a low-speed region, traction control of the drive wheel is carried out in consideration of the grip characteristics between the drive wheel and the road surface in the low-speed region. The following control system and vehicle have been invented in consideration of the foregoing points.

Note that, the traction control of the drive wheel in the following description preferably includes the control for positively sliding the drive wheel.

According to a preferred embodiment of the present invention, a control system that carries out, in a vehicle including a drive wheel and an engine, traction control of the drive wheel includes a slip speed detector that detects a slip speed obtained from the difference between a peripheral speed of the drive wheel and a vehicle body speed of the vehicle, a slip ratio detector that detects a slip ratio obtained from the ratio of the slip speed to the peripheral speed of the drive wheel or the vehicle body speed, and an engine output adjuster that adjusts an output of the engine, wherein the engine output adjuster carries out first traction control to adjust the output of the engine depending on the slip speed detected by the slip speed detector when the vehicle body speed is not more than a predetermined speed, and carries out second traction control to adjust the output of the engine depending on the slip ratio detected by the slip ratio detector when the vehicle body speed is more than the predetermined speed.

In the control system, the slip speed detector detects the slip speed of the drive wheel. Further, the slip ratio detector detects the slip ratio of the drive wheel.

When the vehicle body speed is not more than the predetermined speed, the engine output adjuster adjusts the output of the engine depending on the slip speed of the drive wheel detected by the slip speed detector. When the vehicle body speed is more than the predetermined speed, the engine output adjuster adjusts the output of the engine depending on the slip ratio of the drive wheel detected by the slip ratio detector.

Here, when the vehicle body speed is a low speed (when the vehicle starts moving, for example), the peripheral speed of the drive wheel rapidly rises, while the peripheral speed of a driven wheel hardly rises. That is, the drive wheel is rotated with the driven wheel almost stopped.

In such a state, the slip ratio significantly changes by a slight change in the peripheral speed of the drive wheel. When the slip ratio of the drive wheel is determined from the ratio of the slip speed to the vehicle body speed, the slip speed takes a value greater than the vehicle body speed in a low-speed state, so that the slip ratio of the drive wheel varies at a significantly high value. Therefore, it is difficult to determine the most suitable slip ratio of the drive wheel in a low-speed state.

When the output of the engine is adjusted depending on the slip ratio of the drive wheel in a low-speed state, the variation width of the peripheral speed of the drive wheel increases. In this case, a driver has an uncomfortable feeling.

As described in the foregoing, at the time of a low speed, the slip ratio of the drive wheel significantly changes by a slight change in the peripheral speed of the drive wheel. When the output of the engine is adjusted depending on the slip ratio of the drive wheel at the time of a low speed, therefore, the driver cannot easily estimate the slip speed and the peripheral speed of the drive wheel.

The control system according to various preferred embodiments of the present invention allows the foregoing problems to be solved. That is, the control system according to preferred embodiments of the present invention allows the output of the engine to be adjusted depending on the slip speed of the drive wheel at the time of a low speed. In this case, the most suitable slip speed of the drive wheel can be easily determined, which greatly improves the operability of the vehicle.

Since the variation in the peripheral speed of the drive wheel can be reduced at the time of a low speed, the vehicle body speed of the vehicle can be stabilized. This can prevent the driver from having an uncomfortable feeling at the time of a low speed. Further, the variation in the peripheral speed of the drive wheel is reduced. Therefore, the slip speed and the peripheral speed of the drive wheel can be easily estimated. This causes the drivability of the vehicle to be improved.

Furthermore, at the time of an intermediate or high speed, the output of the engine is adjusted depending on the slip ratio of the drive wheel. Here, when the vehicle body speed is an intermediate or high speed, the most suitable slip ratio of the drive wheel is determined depending on road surface conditions. Consequently, the slip ratio of the drive wheel is set to the most suitable value depending on road surface conditions during traveling, which allows the vehicle to be easily accelerated and allows a grip force in a transverse direction of the drive wheel to be sufficiently ensured. As a result, the operability of the vehicle is improved.

As a result of the foregoing, it is possible to carry out traction control suitable for any speed of the vehicle.

The engine output adjuster may adjust the output of the engine such that the slip speed detected by the slip speed detector follows a target slip speed in the first traction control, and may adjust the output of the engine such that the slip ratio detected by the slip ratio detector follows a target slip ratio in the second traction control.

In this case, at the time of a low speed, the output of the engine is adjusted such that the slip speed of the drive wheel follows the target slip speed by the first traction control. This allows the driver to easily determine the most suitable target slip speed.

The driver can easily estimate the peripheral speed of the drive wheel from the vehicle body speed and the target slip speed at the time of a low speed. Consequently, the driver can easily estimate the behavior of the vehicle on the basis of the vehicle body speed and the target slip speed.

Furthermore, at the time of an intermediate or high speed, the output of the engine is adjusted such that the slip ratio of the drive wheel follows the target slip ratio by the second traction control. In this case, the target slip ratio is set to the most suitable value depending on road surface conditions during traveling, which allows the vehicle to be easily accelerated and allows the grip force in the transverse direction of the drive wheel to be sufficiently ensured. As a result of the foregoing, the operability of the vehicle is sufficiently improved.

The engine output adjuster may start the first or second traction control at the earlier of a point in time when the slip speed detected by the slip speed detector first exceeds a first threshold value after the engine output adjuster is operated and when the vehicle body speed is not more than the predetermined speed and a point in time when the slip ratio detected by the slip ratio detector first exceeds a second threshold value after the engine output adjuster is operated and when the vehicle body speed is more than the predetermined speed.

In this case, the quick and most suitable traction control can be carried out irrespective of the vehicle body speed of the vehicle.

The first threshold value may change depending on the vehicle body speed so as to reach its maximum when the vehicle body speed is zero.

Here, when the vehicle starts moving, the peripheral speed of the drive wheel more rapidly rises, as compared with the peripheral speed of the driven wheel. When the vehicle body speed is an ultra-low speed, therefore, the traction control is carried out at nearly the same time that the vehicle starts moving when the first threshold value is set to a low value. In this case, control for reducing the output of the engine is carried out at nearly the same time that the vehicle starts moving, so that the engine may, in some cases, be stopped.

On the other hand, according to preferred embodiments of the present invention, when the vehicle body speed is an ultra-low speed, the first threshold value can be set to a sufficiently high value. In this case, control for reducing the output of the engine is not carried out until the peripheral speed of the drive wheel reaches a sufficient speed. Consequently, the output of the engine can be prevented from being reduced at nearly the same time that the vehicle starts moving. This can prevent the engine from being stopped.

The first threshold value may decrease as the vehicle body speed increases. In this case, the traction control suitable for the vehicle body speed can be carried out. This allows the operability of the vehicle to be sufficiently improved.

The engine output adjuster may adjust the output of the engine such that the slip speed detected by the slip speed detector follows the first threshold value when the target slip speed is more than the first threshold value in the first traction control.

Here, when the target slip speed is set to a high value, for example, and the output of the engine is adjusted such that the slip speed of the drive wheel follows the target slip speed at the above-mentioned predetermined speed, the peripheral speed of the drive wheel increases. When the target slip ratio is set to a low value, the peripheral speed of the drive wheel decreases in the vicinity of the predetermined speed.

In the case of switching from the first traction control to the second traction control at the predetermined speed, the peripheral speed of the drive wheel greatly changes. This causes the driver to have an uncomfortable feeling.

On the other hand, according to preferred embodiments of the present invention, when the target slip speed is more than the first threshold value, the output of the engine is adjusted such that the slip speed of the drive wheel follows the first threshold value. In this case, the first threshold value decreases as the vehicle body speed increases. Therefore, at the predetermined speed, the peripheral speed of the drive wheel can be prevented from taking a high value. Even when the target slip ratio is set to a low value, therefore, the peripheral speed of the drive wheel can be prevented from greatly changing when the control is switched. As a result, the traveling performances of the vehicle are improved.

Furthermore, in this case, after the vehicle starts moving so that the peripheral speed of the drive wheel rapidly rises, the peripheral speed of the drive wheel and the peripheral speed of the driven wheel can be gradually brought closer to each other. This allows the traveling performances of the vehicle at the time of an intermediate or low speed to be sufficiently improved.

The control system may further include a target slip amount setter that sets the slip speed and the slip ratio that are determined depending on a manipulated variable of an accelerator by a driver, respectively, as the target slip speed and the target slip ratio. In this case, the driver can optionally adjust the slip speed or the slip ratio while sliding the drive wheel according to his or her intention by adjusting the manipulated variable of the accelerator. This allows the driver to enjoy comfortable traveling of the vehicle.

On a paved road surface, for example, the manipulated variable of the accelerator is adjusted such that the target slip ratio will be about 5% to about 10%, which allows the vehicle to be easily accelerated and allows the grip force in the transverse direction of the drive wheel to be sufficiently ensured. This allows the operability of the vehicle to be sufficiently improved.

Furthermore, the output of the engine is adjusted such that the slip speed and the slip ratio of the drive wheel respectively follow the target slip speed and the target slip ratio, which can prevent differences from respectively occurring between the actual slip speed and the actual slip ratio of the drive wheel and the target slip speed and the target slip ratio that are required by the driver. This allows the driver to enjoy more comfortable traveling.

The control system may further include an upper limit setter that sets the respective upper limits of the target slip speed and the target slip ratio that can be set by the target slip amount setter.

In this case, the driver can adjust the respective upper limits of the target slip speed and the target slip ratio in consideration of various elements such as a level of skill, road surface conditions, and weather conditions. This allows the operability of the vehicle to be sufficiently improved.

The control system may further include a throttle valve that adjusts the amount of air supplied to the engine, an engine rotational speed detector that detects the rotational speed of the engine, and a storage device that stores information representing the relationship among the rotational speed of the engine, the output of the engine, and the opening of the throttle valve, wherein the engine output adjuster adjusts the output of the engine by adjusting the opening of the throttle valve on the basis of the rotational speed detected by the engine rotational speed detector and the information stored in the storage device.

In this case, the engine output adjuster can easily derive the most suitable throttle opening for obtaining a desired output from the engine on the basis of the rotational speed detected by the engine rotational speed detector and the information stored in the storage device. This allows a time period required for processing by the engine output adjuster to be shortened and allows the traction control of the drive wheel to be quickly carried out.

The control system may further include an operation switch for activating the engine output adjuster.

In this case, the driver can optionally choose whether or not the traction control is carried out by operating the operation switch. Consequently, the driver can enjoy more comfortable traveling of the vehicle by operating the operation switch in consideration of various elements such as a level of skill, road surface conditions, and weather conditions.

The engine output adjuster may not set a torque outputted by the engine to not more than zero in the first and second traction control.

In this case, a braking force (an engine brake) is prevented from being applied to the drive wheel at the time of the traction control, so that the traveling performances of the vehicle are improved.

According to another preferred embodiment of the present invention, a control system that carries out, in a vehicle including a drive wheel and an engine, traction control of the drive wheel includes a slip speed detector that detects a slip speed obtained from the difference between a peripheral speed of the drive wheel and a vehicle body speed of the vehicle, a slip ratio detector that detects a slip ratio obtained from the ratio of the slip speed to the peripheral speed of the drive wheel or the vehicle body speed, and an engine output adjuster that adjusts an output of the engine depending on the slip speed or the slip ratio of the drive wheel, wherein the engine output adjuster starts the traction control at the earlier of a point in time when the slip speed detected by the slip speed detector first exceeds a first threshold value after the engine output adjuster is operated and when the vehicle body speed is not more than a predetermined speed and a point in time when the slip ratio detected by the slip ratio detector first exceeds a second threshold value after the engine output adjuster is operated and when the vehicle body speed is more than the predetermined speed.

In the control system, the slip speed detector detects the slip speed of the drive wheel. Further, the slip ratio detector detects the slip ratio of the drive wheel. The engine output adjuster adjusts the output of the engine depending on the slip speed or the slip ratio of the drive wheel.

Here, when the vehicle body speed is a low speed (e.g., when the vehicle starts moving), the peripheral speed of the drive wheel rapidly rises, while the peripheral speed of a driven wheel hardly rises. That is, the drive wheel is rotated with the driven wheel almost stopped.

In such a state, the slip ratio significantly changes by a slight change in the peripheral speed of the drive wheel. When the slip ratio of the drive wheel is determined from the ratio of the slip speed to the vehicle body speed, the slip speed takes a value greater than the vehicle body speed in a low-speed state, so that the slip ratio of the drive wheel varies at a significantly high value. Therefore, it is difficult to find out the most suitable slip ratio of the drive wheel in a low-speed state.

A control system according to various preferred embodiments of the present invention allows this problem to be solved. In the control system according to preferred embodiments of the present invention, the traction control is started when the slip speed of the drive wheel exceeds a first threshold value at the time of a low speed. That is, it is determined whether or not traction control is carried out on the basis of the threshold value (first threshold value) of the slip speed in a low-speed state. Here, the most suitable slip speed of the drive wheel can be easily determined when the vehicle is at a low speed. Consequently, it is possible to start the traction control at the suitable point in time by determining the first threshold value on the basis of the most suitable slip speed.

Furthermore, at the time of an intermediate or high speed, the traction control is started when the slip ratio of the drive wheel exceeds the second threshold value. Here, when the vehicle body speed is an intermediate or high-speed, the most suitable slip ratio of the drive wheel is determined depending on road surface conditions. Consequently, it is possible to start the traction control at a suitable point in time by setting the second threshold value to the most suitable value depending on road surface conditions during traveling.

As a result of the foregoing, it is possible to carry out traction control suitable for any speed of the vehicle.

According to still another preferred embodiment of the present invention, a vehicle includes a drive wheel, an engine that produces a driving force rotating the drive wheel, a driving force transmitter arranged to transmit the driving force produced by the engine to the drive wheel, and a control system that carries out traction control of the drive wheel, wherein the control system includes a slip speed detector that detects a slip speed obtained from the difference between a peripheral speed of the drive wheel and a vehicle body speed of the vehicle, a slip ratio detector that detects a slip ratio obtained from the ratio of the slip speed to the peripheral speed of the drive wheel or the vehicle body speed, and an engine output adjuster that adjusts an output of the engine, wherein the engine output adjuster carries out first traction control to adjust the output of the engine depending on the slip speed detected by the slip speed detector when the vehicle body speed is not more than a predetermined speed, and carries out second traction control to adjust the output of the engine depending on the slip ratio detected by the slip ratio detector when the vehicle body speed is more than the predetermined speed.

In the vehicle, the driving force transmitter transmits the driving force produced by the engine to the drive wheel. Thus, the drive wheel is driven.

Further, in the control system, the slip speed detector detects the slip speed of the drive wheel. Further, the slip ratio detector detects the slip ratio of the drive wheel.

When the vehicle body speed is not more than the predetermined speed, the engine output adjuster adjusts the output of the engine depending on the slip speed of the drive wheel detected by the slip speed detector. When the vehicle body speed is more than the predetermined speed, the engine output adjuster adjusts the output of the engine depending on the slip ratio of the drive wheel detected by the slip ratio detector.

In this case, at the time of a low speed, the output of the engine can be adjusted depending on the slip speed of the drive wheel. Thus, the most suitable slip speed of the drive wheel can be easily determined, which greatly improves the operability of the vehicle.

Since the variation in the peripheral speed of the drive wheel can be reduced at the time of a low speed, the vehicle body speed of the vehicle can be stabilized. This can prevent the driver from having an uncomfortable feeling at the time of a low speed.

Furthermore, at the time of an intermediate or high speed, the output of the engine is adjusted depending on the slip ratio of the drive wheel. Here, when the vehicle body speed is an intermediate or high speed, the most suitable slip ratio of the drive wheel is determined depending on road surface conditions. Consequently, the slip ratio of the drive wheel is set to the most suitable value depending on road surface conditions during traveling, which allows the vehicle to be easily accelerated and allows the grip force in the transverse direction of the drive wheel to be sufficiently ensured. As a result, the operability of the vehicle is improved.

As a result of the foregoing, it is possible to carry out traction control suitable for any speed of the vehicle.

According to still another preferred embodiment of the present invention, a vehicle includes a drive wheel, an engine that produces a driving force rotating the drive wheel, a driving force transmitter arranged to transmit the driving force produced by the engine to the drive wheel, and a control system that carries out traction control of the drive wheel, wherein the control system includes a slip speed detector that detects a slip speed obtained from the difference between a peripheral speed of the drive wheel and a vehicle body speed of the vehicle, a slip ratio detector that detects a slip ratio obtained from the ratio of the slip speed to the peripheral speed of the drive wheel or the vehicle body speed, and an engine output adjuster that adjusts an output of the engine depending on the slip speed or the slip ratio of the drive wheel, wherein the engine output adjuster starts the traction control at the earlier of a point in time when the slip speed detected by the slip speed detector first exceeds a first threshold value after the engine output adjuster is operated and when the vehicle body speed is not more than a predetermined speed and a point in time when the slip ratio detected by the slip ratio detector first exceeds a second threshold value after the engine output adjuster is operated and when the vehicle body speed is more than the predetermined speed.

In the vehicle, the driving force transmitter transmits the driving force produced by the engine to the drive wheel. Thus, the drive wheel is driven.

Further, in the control system, the slip speed detector detects the slip speed of the drive wheel. Further, the slip ratio detector detects the slip ratio of the drive wheel. The engine output adjuster adjusts the output of the engine depending on the slip speed or the slip ratio of the drive wheel.

Furthermore, at the time of a low speed, the traction control is started when the slip speed of the drive wheel exceeds the first threshold value. That is, it is determined whether or not the traction control is carried out on the basis of the threshold value (first threshold value) of the slip speed in a low-speed state. Here, when the vehicle is at a low speed, the most suitable slip speed of the drive wheel can be easily determined. Consequently, it is possible to start the traction control at a suitable point in time by determining the first threshold value on the basis of the most suitable slip speed.

Furthermore, at the time of an intermediate or high speed, the traction control is started when the slip ratio of the drive wheel exceeds the second threshold value. Here, when the vehicle body speed is an intermediate or high-speed, the most suitable slip ratio of the drive wheel is determined depending on road surface conditions. Consequently, it is possible to start the traction control at a suitable point in time by setting the second threshold value to the most suitable value depending on road surface conditions during traveling.

As a result of the foregoing, it is possible to carry out traction control suitable for any speed of the vehicle.

Other features, elements, characteristics, and advantages of the present invention will become more apparent from the following description of preferred embodiments of the present invention with reference to the attached drawings.

BRIEF DESCRIPTION OF THE DRAWINGS

FIG. 2 is a schematic view showing the configuration of a control system.

FIG. 8 is a diagram showing an example of target slip speed data.

FIG. 10 is a flow chart showing an example of a control operation of an ECU in slip speed traction control.

FIG. 13 is a diagram for explaining the relationship among a front wheel speed (vehicle speed), a threshold value of a slip speed, a target slip speed, a threshold value of a slip ratio, and a target slip ratio.

FIG. 14 is a diagram showing an example of the change in a rear wheel speed.

FIG. 15 is a diagram showing the relationship among a front wheel speed (vehicle speed), a threshold value of a slip speed, a target slip speed, a threshold value of a slip ratio, and a target slip ratio in a case where an accelerator opening is fixed at about 70%.

FIG. 16 is a diagram showing the relationship among a front wheel speed (vehicle speed), a threshold value of a slip speed, a target slip speed, a threshold value of a slip ratio, and a target slip ratio in a case where an accelerator opening is fixed at about 20%.

FIG. 20 is a diagram showing another example of a setting panel.

DETAILED DESCRIPTION OF THE PREFERRED EMBODIMENTS

A control system according to preferred embodiments of the present invention and a vehicle including the same will be described with reference to the drawings. A motorcycle will be described as an example of the vehicle.

Configuration of Motorcycle

Figure 1:
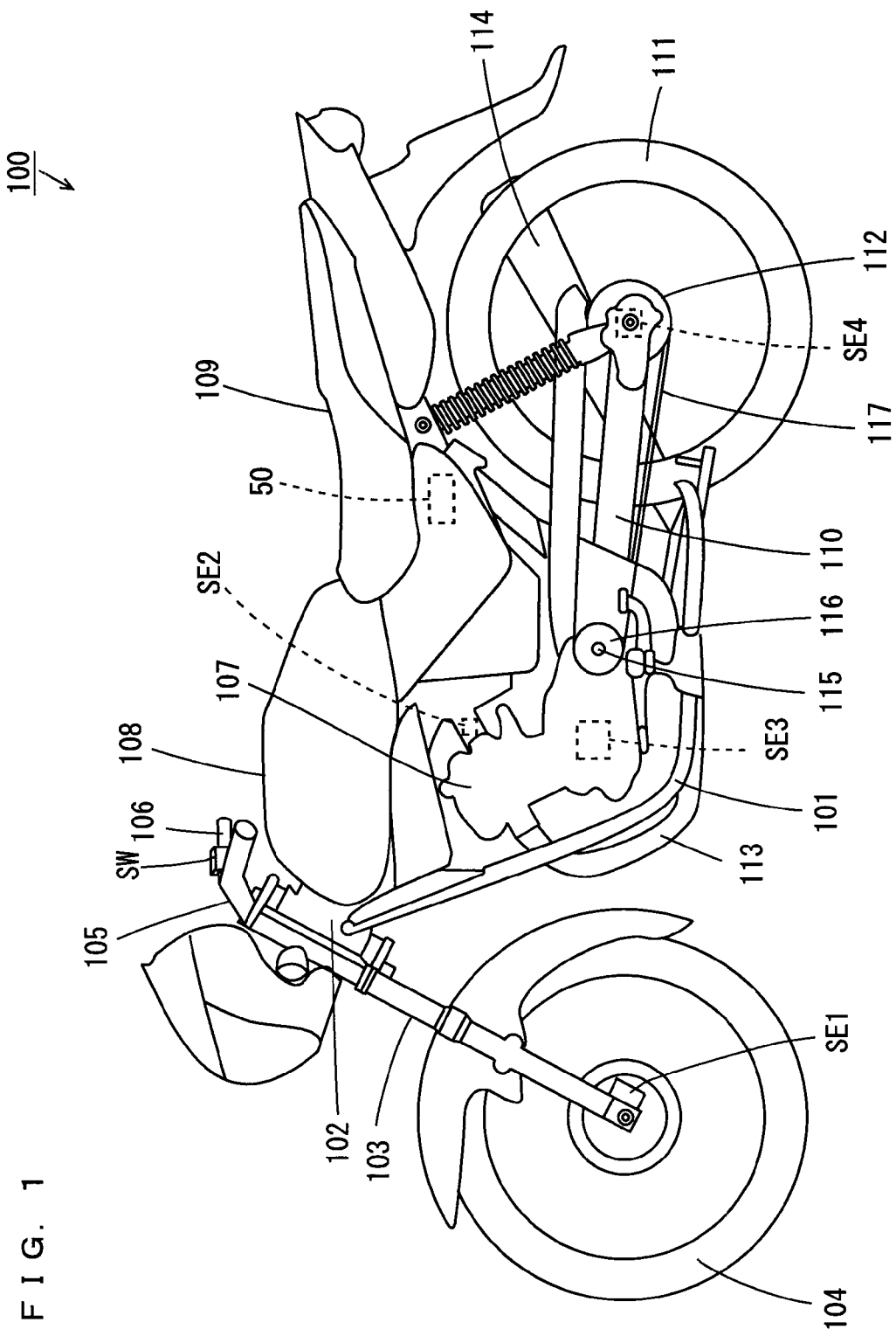
FIG. 1 is a schematic side view showing a motorcycle.

FIG. 1 is a schematic side view showing a motorcycle according to the present preferred embodiment of the present invention.

In a motorcycle 100 shown in FIG. 1, a head pipe 102 is provided at a front end of a main body frame 101. A front fork 103 is provided so as to be swingable rightward and leftward in the head pipe 102. A front wheel 104 is rotatably supported at a lower end of the front fork 103. Further, a front wheel speed sensor SE1 is provided at the lower end of the front fork 103. The front wheel speed sensor SE1 detects the rotational speed of the front wheel 104, and supplies a detected value to an ECU (Electronic Control Unit) 50, described later.

The head pipe 102 has a handle 105 provided at its upper end. The handle 105 is provided with an accelerator grip 106 and a switch SW. The switch SW has a switch button (not shown). When the switch button is pressed, the switch SW feeds to the ECU 50 a signal indicating that the switch button is pressed.

An engine 107 is provided at the center of the main body frame 101. An accelerator opening sensor SE2 is provided near the engine 107 (near an ETV 82 (FIG. 2), described later). The accelerator opening sensor SE2 detects a manipulated variable of the accelerator grip 106 (hereinafter referred to as an accelerator opening) by a driver, and supplies a detected value to the ECU 50.

The engine 107 is provided with an engine rotational speed sensor SE3. The engine rotational speed sensor SE3 detects the rotational speed of the engine 107, and supplies a detected value to the ECU 50. A fuel tank 108 is provided above the engine 107, and a seat 109 is provided behind the fuel tank 108. The ECU 50 is provided below the seat 109.

A rear arm 110 is connected to the main body frame 101 to extend behind the engine 107. The rear arm 110 rotatably holds a rear wheel 111 and a rear wheel driven sprocket 112.

The rear wheel driven sprocket 112 is provided with a rear wheel speed sensor SE4. The rear wheel speed sensor SE4 detects the rotational speed of the rear wheel 111, and supplies a detected value to the ECU 50. One end of an exhaust pipe 113 is attached to an exhaust port of the engine 107. A muffler 114 is attached to the other end of the exhaust pipe 113.

A drive shaft 115 is attached to the engine 107, and a rear wheel drive sprocket 116 is attached to the drive shaft 115. The rear wheel drive sprocket 116 is connected to the rear wheel driven sprocket 112 of the rear wheel 111 through a chain 117.

Configuration of Control System

FIG. 2 is a schematic view showing the configuration of a control system 200 according to the present preferred embodiment of the present invention. As shown in FIG. 2, the control system 200 preferably includes the ECU 50, the front wheel speed sensor SE1, the accelerator opening sensor SE2, the engine rotational speed sensor SE3, the rear wheel speed sensor SE4, the switch SW, and the engine 107.

The engine 107 has a cylinder 71. A piston 72 is provided so as to be movable up and down within the cylinder 71. Further, a combustion chamber 73 is provided in an upper portion of the cylinder 71. The combustion chamber 73 communicates with the outside of the engine 107 through an intake port 74 and an exhaust port 75.

A intake valve 76 is arranged so as to be capable of being opened or closed at an open end 74a on the downstream side of the intake port 74, and an exhaust valve 77 is arranged so as to be capable of being opened or closed at an open end 75a on the upstream side of the exhaust port 75. The intake valve 76 and the exhaust valve 77 are driven by a normal cam mechanism. A spark plug 78 for performing spark ignition within the combustion chamber 73 is provided on an upper portion of the combustion chamber 73.

An intake pipe 79 is attached to the engine 107 so as to communicate with the intake port 74, and an exhaust pipe 80 is attached thereto so as to communicate with the exhaust port 75. The intake pipe 79 is provided with an injector 81 for feeding fuel into the cylinder 71. Further, the electronic controlled throttle valve (ETV) 82 is provided within the intake pipe 79.

When the engine 107 is operated, air is sucked into the combustion chamber 73 from the intake port 74 through the intake pipe 79, and fuel is fed into the combustion chamber 73 by the injector 81. Thus, an air-fuel mixture is generated within the combustion chamber 73, so that the spark plug 78 spark-ignites the air-fuel mixture. Burned gas generated by burning the air-fuel mixture in the combustion chamber 73 is discharged from the exhaust port 75 through the exhaust pipe 80.

Figure 3:
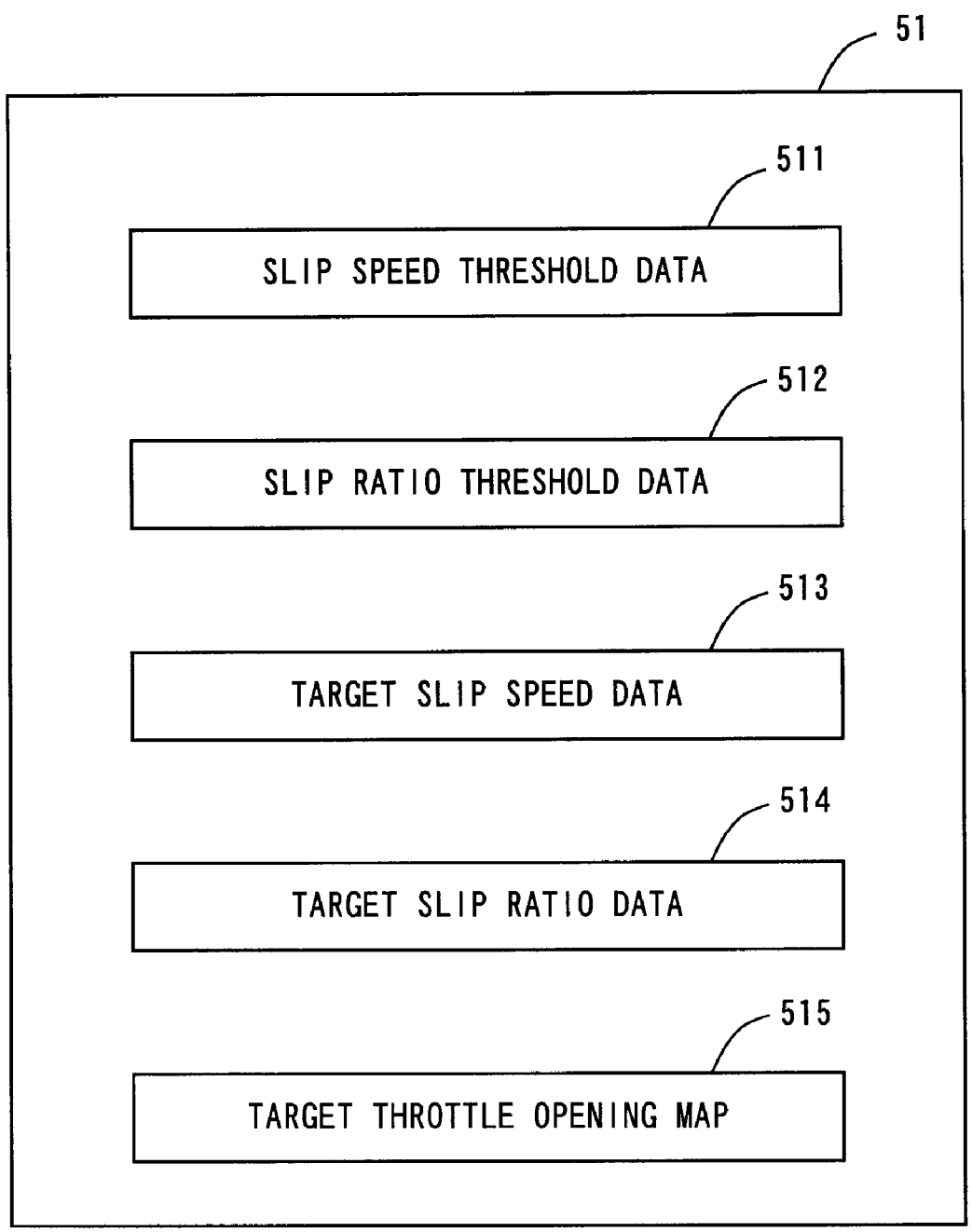
FIG. 3 is a conceptual diagram showing the memory contents of a storage device.

The ECU 50 includes a storage device 51 and a PID (Proportional Integral Derivative) controller 52. FIG. 3 is a conceptual diagram showing the memory contents of the storage device 51. As shown in FIG. 3, the storage device 51 preferably stores slip speed threshold data 511, slip ratio threshold data 512, target slip speed data 513, target slip ratio data 514, and a target throttle opening map 515. The details of the four data 511 to 514 and the target throttle opening map 515 will be described later. Further, the PID controller 52 calculates a target torque in slip speed traction control and slip ratio traction control, described later.

As shown in FIG. 2, the respective detected values of the front wheel speed sensor SE1, the accelerator opening sensor SE2, the engine rotational speed sensor SE3, and the rear wheel speed sensor SE4 are supplied to the ECU 50. Further, various detected values are respectively provided from various types of sensors such as a water temperature sensor, an oil temperature sensor, a throttle sensor, an oxygen sensor, and an inlet temperature sensor, which are not illustrated. The ECU 50 controls the operations of the intake valve 76, the exhaust valve 77, the spark plug 78, the injector 81, the ETV 82, and so on, on the basis of the plurality of detected values given from the plurality of sensors. This causes the ignition timing of the air-fuel mixture within the cylinder 71 to be adjusted.

Traction Control

Outline of Traction Control

As traction control in the present preferred embodiment, slip speed traction control and slip ratio traction control are selectively carried out. In the slip speed traction control, the ECU 50 adjusts a torque outputted by the engine 107 such that an actual slip speed follows a target slip speed. In the slip speed traction control, the ECU 50 adjusts the torque outputted by the engine 107 such that an actual slip ratio follows a target slip ratio. The details of the slip speed traction control and the slip ratio traction control will be described later.

The ECU 50 carries out the slip speed traction control when the vehicle speed (vehicle body speed) of the motorcycle 100 is not more than a predetermined speed (e.g., approximately 10 km/h) and the actual slip speed is not less than a threshold value of a slip speed. Further, the ECU 50 carries out the slip ratio traction control when the vehicle speed of the motorcycle 100 is more than the predetermined speed and the actual slip ratio is not less than a threshold value of a slip ratio.

In the present preferred embodiment, the peripheral speed (front wheel speed) of the front wheel 104 calculated in the following equation (1) is taken as a vehicle speed (km/h).

$$\text{Vehicle speed} = \text{front wheel speed} = \text{front wheel rotational speed} \times \text{peripheral length of tire of front wheel} \quad (1)$$

Furthermore, the actual slip speed (km/h) is calculated by the following equation (2):

$$\text{Actual slip speed} = \text{rear wheel speed} - \text{front wheel speed} \quad (2)$$

The peripheral speed (rear wheel speed) of the rear wheel 111 is calculated by the following equation (3):

$$\text{Rear wheel speed} = \text{rear wheel rotational speed} \times \text{peripheral length of tire of rear wheel} \quad (3)$$

Figure 4:
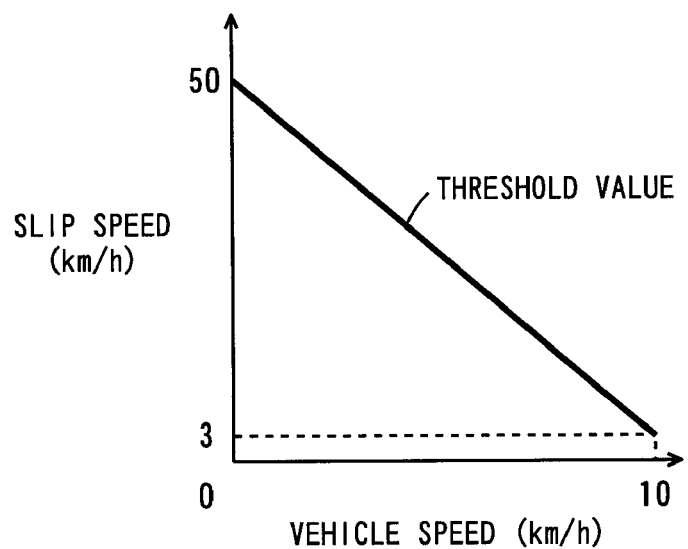
FIG. 4 is a diagram showing an example of slip speed threshold data.

The threshold value of the slip speed is stored in the slip speed threshold data 511 (FIG. 3). FIG. 4 shows an example of the slip speed threshold data 511. In FIG. 4, the vertical axis indicates slip speed, and the horizontal axis indicates vehicle speed. As shown in FIG. 4, the slip speed threshold data 511 represents the relationship between the vehicle speed and the threshold value of the slip speed in a region where the vehicle speed is about 0 km/h to about 10 km/h.

In the slip speed threshold data 511 shown in FIG. 4, the threshold value of the slip speed with the vehicle speed of about 0 km/h is preferably set to about 50 km/h, and the threshold value of the slip speed with the vehicle speed of about 10 km/h is preferably set to about 3 km/h, for example. Further, the threshold value of the slip speed is set so as to linearly decrease as the vehicle speed increases.

The threshold value of the slip speed with the vehicle speed of 0 km/h can be adjusted by a setting panel, described later. Further, the threshold value of the slip speed with the vehicle speed of 10 km/h is determined depending on the threshold value of the slip ratio, described later. The details will be described later.

The actual slip ratio is calculated by the following equation (4):

$$\text{Actual slip ratio} = \text{actual slip speed} \div \text{front wheel speed} \times 100 \quad (4)$$

Figure 5:
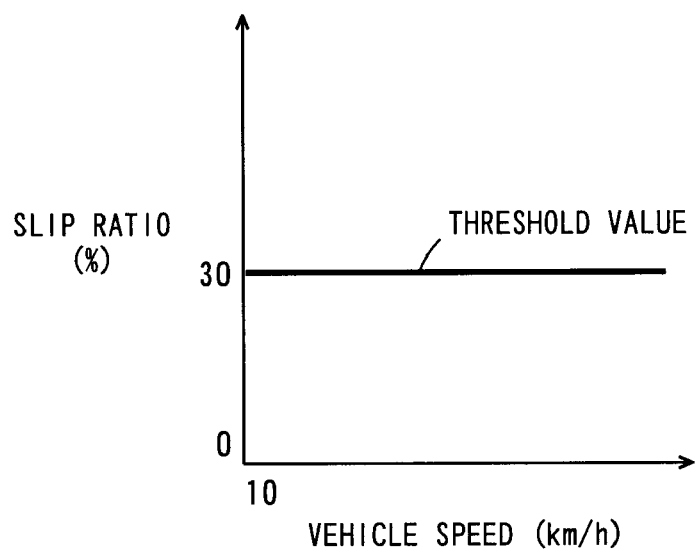
FIG. 5 is a diagram showing an example of slip ratio threshold data.

The threshold value of the slip ratio is stored in the slip ratio threshold data 512 (FIG. 3). FIG. 5 shows an example of the slip ratio threshold data 512. In FIG. 5, the vertical axis indicates slip ratio, and the horizontal axis indicates vehicle speed. As shown in FIG. 5, the slip ratio threshold data 512 represents the relationship between the vehicle speed and the threshold value of the slip ratio in a region where the vehicle speed is not less than about 10 km/h, for example. In the slip ratio threshold data 512 shown in FIG. 5, the threshold value is preferably set to about 30%. The threshold value of the slip ratio can be adjusted by a setting panel, described later. The details will be described later.

The control operation of the ECU 50 will be described below with reference to the drawings. In the following description, the control operation of the ECU 50 in a case where the motorcycle 100 is normally traveling is referred to as normal control. That is, in the normal control, the ECU does not carry out the traction control of the rear wheel 111.

Overall Control Flow

Figure 6:
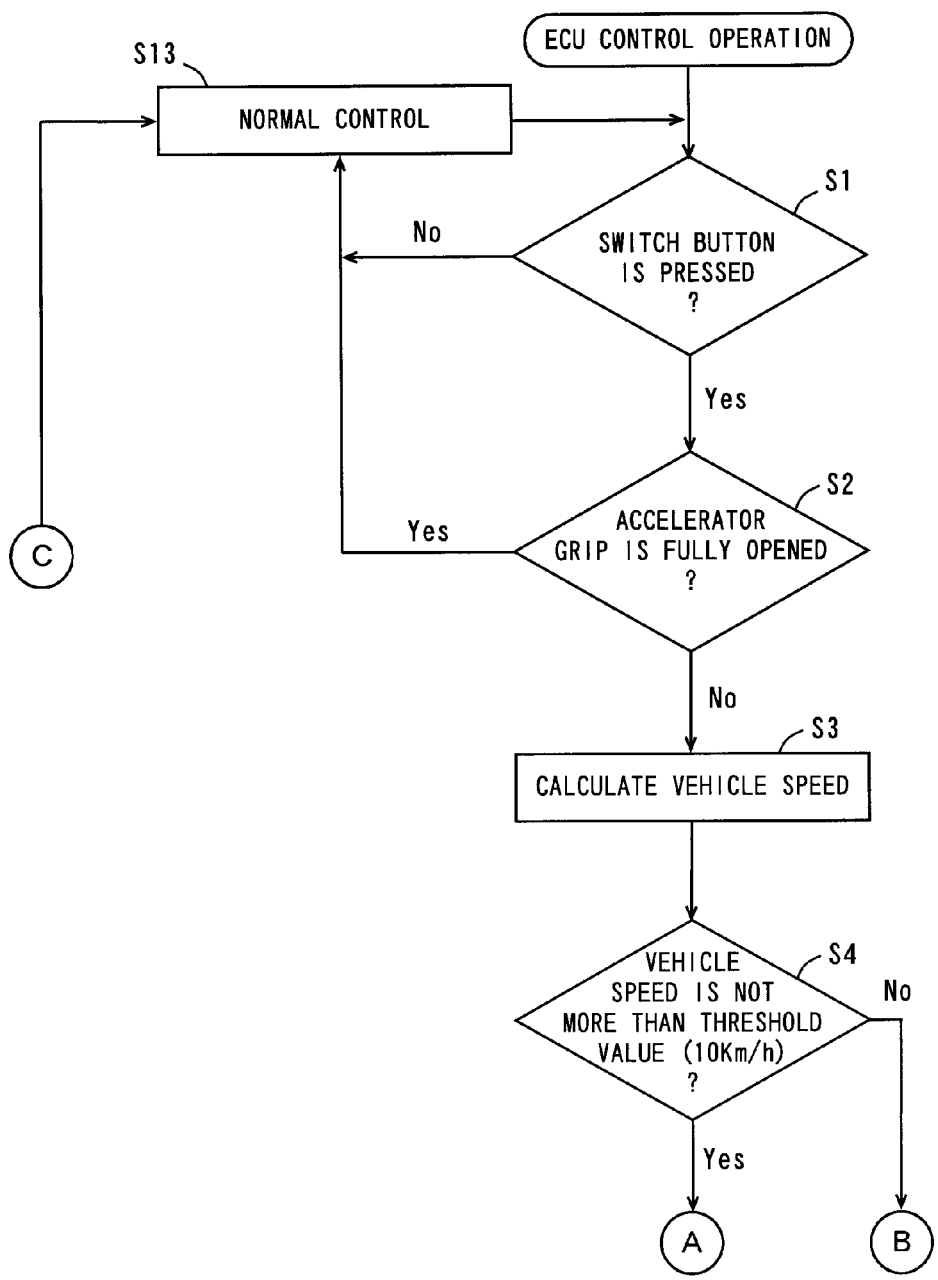
FIG. 6 is a flow chart showing an example of a control operation of an ECU.
Figure 7:
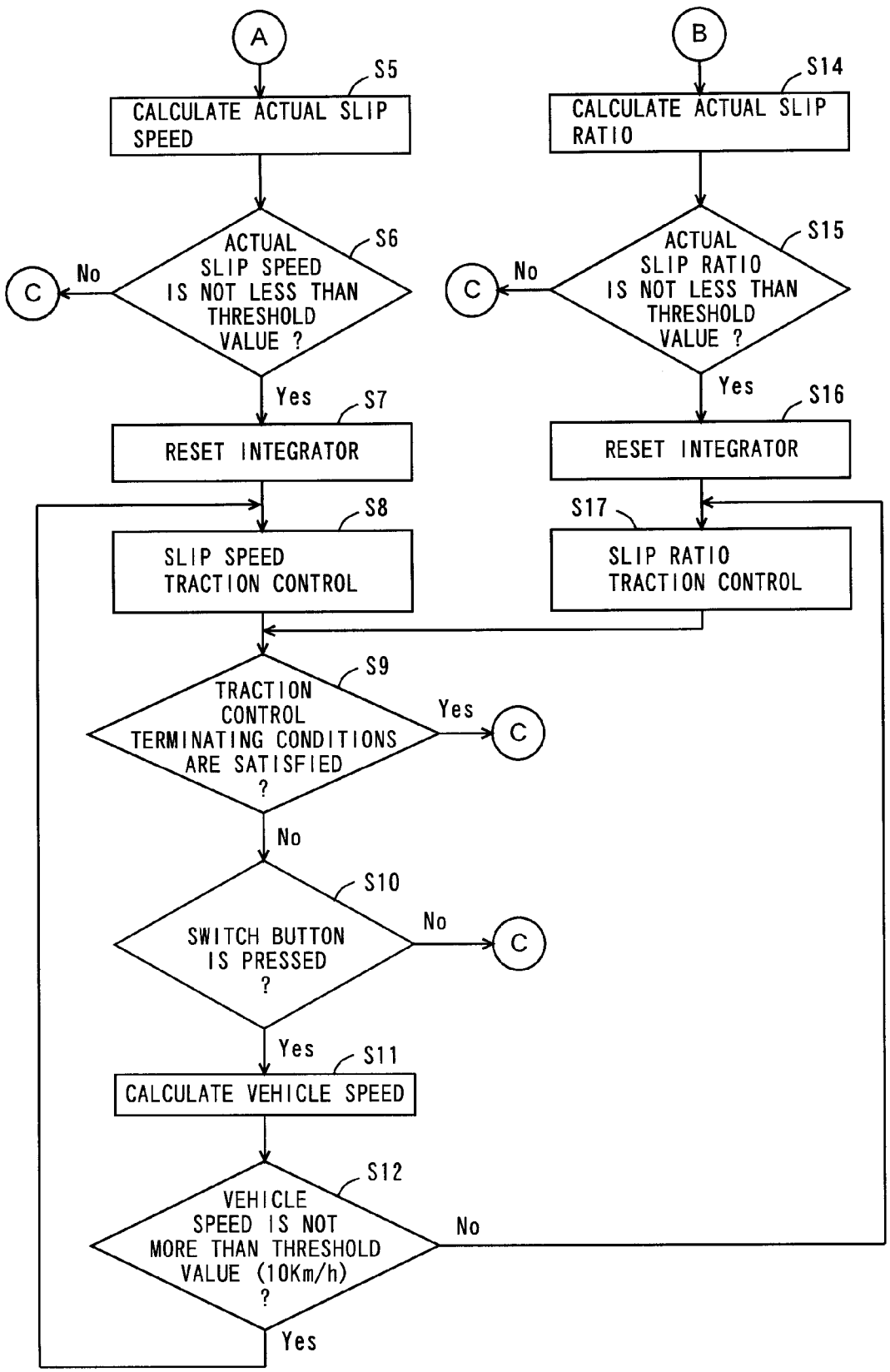
FIG. 7 is a flow chart showing an example of a control operation of an ECU.

FIGS. 6 and 7 are flow charts showing an example of the control operation of the ECU 50.

As shown in FIG. 6, the ECU 50 determines whether or not the switch button is pressed on the basis of an output signal of the switch SW (FIGS. 1 and 2) (step S1). When the switch button is pressed, the ECU 50 determines whether or not the accelerator grip 106 (see FIG. 1) is fully closed on the basis of the detected value of the accelerator opening sensor SE2 (see FIGS. 1 and 2) (step S2).

When the accelerator grip 106 is not fully closed, the ECU 50 calculates the vehicle speed of the motorcycle 100 on the basis of the detected value of the front wheel speed sensor SE1 (see FIGS. 1 and 2) (step S3).

The ECU 50 then determines whether or not the vehicle speed of the motorcycle 100 is not more than the threshold value (e.g., about 10 km/h) (step S4). When the vehicle speed of the motorcycle 100 is not more than the threshold value, the ECU 50 calculates the actual slip speed of the motorcycle 100 on the basis of the respective detected values of the front wheel speed sensor SE1 and the rear wheel speed sensor SE4 (step S5), as shown in FIG. 7.

The ECU 50 then determines whether or not the actual slip speed is not less than the threshold value on the basis of the vehicle speed calculated in the step S3 (FIG. 6) and the slip speed threshold data 511 (FIG. 4) (step S6).

When the actual slip speed is not less than the threshold value, the ECU 50 resets an integrator in the PID controller 52 (see FIG. 2) (step S7). The ECU 50 then carries out the slip speed traction control (step S8). The details of the slip speed traction control will be described later.

The ECU 50 then determines whether or not the current state of the motorcycle 100 satisfies traction control terminating conditions (step S9). Note that the traction control terminating conditions in the step S9 include conditions for terminating the slip speed traction control in the step S8 and conditions for terminating the slip ratio traction control in the step S17, described later.

When the actual slip speed is less than the target slip speed and the target throttle opening (%) is more than the accelerator opening (%) detected by the accelerator opening sensor SE2 (FIG. 2) or when the rotational speed of the engine 107 detected by the engine rotational speed sensor SE3 (FIG. 3) is less than a predetermined threshold value (e.g., about 800 rpm), for example, the state of the motorcycle 100 satisfies the conditions for terminating the slip speed traction control in the step S8.

When the actual slip ratio is less than the target slip ratio and the target throttle opening (%) is more than the accelerator opening (%) detected by the accelerator opening sensor SE2 or when the rotational speed of the engine 107 detected by the engine rotational speed sensor SE3 is less than the predetermined threshold value (e.g., about 800 rpm), for example, the state of the motorcycle 100 satisfies the conditions for terminating the slip ratio traction control in the step S17.

When the state of the motorcycle 100 does not satisfy the traction control terminating conditions, the ECU 50 determines whether or not the switch button is pressed on the basis of the output signal of the switch SW (FIGS. 1 and 2) (step S10).

When the switch button is pressed, the ECU 50 calculates the vehicle speed of the motorcycle 100 on the basis of the detected value of the front wheel speed sensor SE1 (step S11).

The ECU 50 then determines whether or not the vehicle speed of the motorcycle 100 is not more than the threshold value (e.g., about 10 km/h) (step S12). When the vehicle speed of the motorcycle 100 is not more than the threshold value, the ECU 50 is returned to the step S8, to carry out the slip speed traction control. Note that the threshold value in the step S12 and the threshold value in the step S4 (see FIG. 6) are the same.

When the switch button is not pressed in the step S1 shown in FIG. 6, the ECU 50 carries out not the traction control of the rear wheel 111 but the normal control (step S13, see FIG. 6).

When the accelerator grip 106 is fully closed in the step S2, the ECU 50 proceeds to the step S13, to carry out the normal control. When the accelerator grip 106 is fully closed in the step S2, it is considered that a torque is hardly generated in the engine 107. Consequently, the traction control of the rear wheel 111 need not be carried out.

Furthermore, when the actual slip speed is less than the threshold value in the step S6 shown in FIG. 7, a case where the state of the motorcycle 100 satisfies the traction control terminating conditions in the step S9 and a case where the switch button is not pressed in the step S10, the ECU 50 proceeds to the step S13 shown in FIG. 6, to carry out the normal control.

When the vehicle speed is more than the threshold value in the step S4 shown in FIG. 6, the ECU 50 calculates the actual slip ratio of the motorcycle 100 on the basis of the respective detected values of the front wheel speed sensor SE1 and the rear wheel speed sensor SE4 (step S14), as shown in FIG. 7.

The ECU 50 then determines whether or not the actual slip ratio is not less than the threshold value on the basis of the vehicle speed calculated in the step S3 (FIG. 6) and the slip ratio threshold data 512 (FIG. 5) (step S15).

When the actual slip ratio is not less than the threshold value, the ECU 50 resets the integrator in the PID controller 52 (see FIG. 2) (step S16). The ECU 50 then carries out the slip ratio traction control (step S17). The details of the slip ratio traction control will be described later. Thereafter, the ECU 50 proceeds to the step S9.

When the actual slip ratio is less than the threshold value in the step S15, the ECU 50 proceeds to the step S13 shown in FIG. 6, to carry out the normal control.

When the vehicle speed is more than the threshold value in the step S12, the ECU 50 proceeds to the step S17, to carry out the slip ratio traction control.

Note that the period of the control operation shown in FIGS. 6 and 7 preferably is about 4 ms, for example.

Slip Speed Traction Control

In the slip speed traction control, the ECU 50 determines the target slip speed using the target slip speed data 513 (FIG. 3). The ECU 50 adjusts the torque outputted by the engine 107 such that the actual slip speed follows the target slip speed.

FIG. 8 shows an example of the target slip speed data 513. In FIG. 8, the vertical axis indicates slip speed, and the horizontal axis indicates accelerator opening. As shown in FIG. 8, the target slip speed data 513 represents the relationship between the accelerator opening and the target slip speed. Note that an accelerator opening of 0% indicates a state where the accelerator grip 106 is fully closed, and an accelerator opening of 100% indicates a state where the accelerator grip 106 is fully opened.

In the target slip speed data 513 shown in FIG. 8, the target slip speed linearly increases as the accelerator opening increases. In the slip speed traction control, therefore, the driver can optionally adjust the actual slip speed of the motorcycle 100 by adjusting the accelerator opening.

Although in the target slip speed data 513 shown in FIG. 8, the upper limit of the target slip speed is preferably set to about 50 km/h, the upper limit of the target slip speed can be adjusted by a setting panel, described later. The details will be described later.

The control flow of the slip speed traction control will be described using the drawings.

Figure 9:
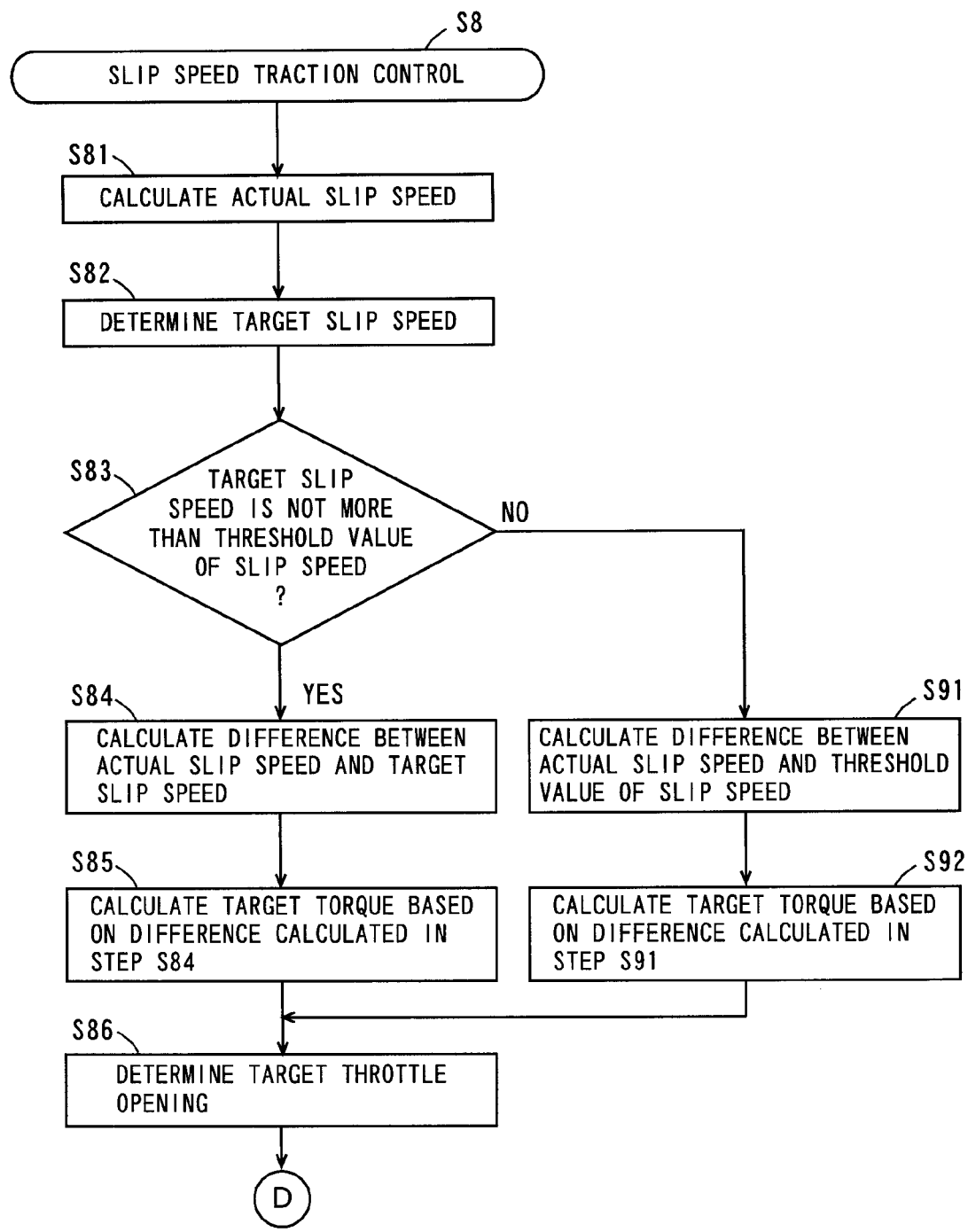
FIG. 9 is a flow chart showing an example of a control operation of an ECU in slip speed traction control.

FIGS. 9 and 10 are flow charts showing an example of the control operation of the ECU 50 in the slip speed traction control.

As shown in FIG. 9, in the slip speed traction control, the ECU 50 first calculates the actual slip speed of the motorcycle 100 (step S81), as in the step S5 (FIG. 7).

The ECU 50 then determines the target slip speed on the basis of the detected value of the accelerator opening sensor SE2 (FIG. 2) and the target slip speed data 513 (FIG. 8) (step S82).

The ECU 50 then determines whether or not the target slip speed is not more than the threshold value of the slip speed on the basis of the slip speed threshold data 511 (FIG. 4) (step S83). When the target slip speed is not more than the threshold value of the slip speed, the ECU 50 calculates the difference between the actual slip speed and the target slip speed (step S84).

The ECU 50 then calculates the target torque on the basis of the difference calculated in the step S84 (step S85). Note that the target torque is the torque outputted by the engine 107 (FIG. 2), which is required to slip the motorcycle 100 (the rear wheel 111) at the target slip speed. The target torque is calculated by a PID operation performed by the PID controller 52 (FIG. 2).

The ECU 50 then determines the target throttle opening on the basis of the target torque, the detected value of the engine rotational speed sensor SE3 (FIG. 2), and the target throttle opening map 515 (FIG. 3) (step S86).

The target throttle opening means the throttle opening of the ETV (FIG. 2), which is required for the engine 107 to output the target torque at the current engine rotational speed. Further, the target throttle opening map 515 preferably is a three-dimensional map representing the relationship among the rotational speed of the engine 107 (FIG. 2), the throttle opening of the ETV 82, and the torque outputted by the engine 107.

As shown in FIG. 10, the ECU 50 then determines the difference between the actual slip speed calculated in the step S81 (FIG. 9) and the actual slip speed before a predetermined time period (e.g., about 40 ms) (step S87). Note that the history of the actual slip speed is stored in the storage device 51 (FIG. 2).

The ECU 50 then determines whether or not the difference calculated in the step S87 is not more than a threshold value (e.g., about 120 km/h) (step S88). When the difference is not more than the threshold value, the ECU 50 adjusts the throttle opening of the ETV 82 on the basis of the target throttle opening determined in the step S86 (FIG. 9) (step S89). Thus, the torque outputted by the engine 107 (FIG. 2) (the traction of the rear wheel 111) is adjusted such that the actual slip speed follows the target slip speed. Thereafter, the ECU 50 proceeds to the step S9 shown in FIG. 7.

When the difference is more than the threshold value in the step S88 shown in FIG. 10, the ECU 50 adjusts the throttle opening of the ETV 82 on the basis of the target throttle opening determined in the step S86 (FIG. 9) and retards the spark-ignition timing of the spark plug 78 (FIG. 2) (by about 30 degrees, for example) (step S90). Thereafter, the ECU 50 proceeds to the step S9 shown in FIG. 7.

Note that the torque outputted by the engine 107 (FIG. 2) can be reduced by retarding the spark-ignition timing by about 30 degrees. Consequently, the provision of the processing in the step S90 allows the torque outputted by the engine 107 to be reduced when the slip speed greatly increases in a short time period, for example. This allows the speed of the motorcycle 100 to be easily stabilized, which causes the operability of the motorcycle 100 to be improved.

When the target slip speed is more than the threshold value of the slip speed in the step S83 shown in FIG. 9, the ECU 50 calculates the difference between the actual slip speed and the threshold value of the slip speed on the basis of the slip speed threshold data 511 (FIG. 4) (step S91).

The ECU 50 then calculates the target torque on the basis of the difference calculated in the step S91 (step S92). Thereafter, the ECU 50 proceeds to the step S86.

The target torque in this case preferably is the torque outputted by the engine 107 (FIG. 2), which is required to slip the motorcycle 100 (the rear wheel 111) at the threshold value of the slip speed (see FIG. 4). When the target slip speed is more than the threshold value in the step S83, therefore, the torque outputted by the engine 107 (FIG. 2) (the traction of the rear wheel 111) is adjusted such that the actual slip speed follows the threshold value of the slip speed.

The effect obtained by performing the processing in the steps S91 and S92 will be described later.

Slip Ratio Traction Control

In the slip ratio traction control, the ECU 50 determines the target slip ratio using the target slip ratio data 514 (FIG. 3). The ECU 50 adjusts the torque outputted by the engine 107 such that the actual slip ratio follows the target slip ratio.

Figure 11:
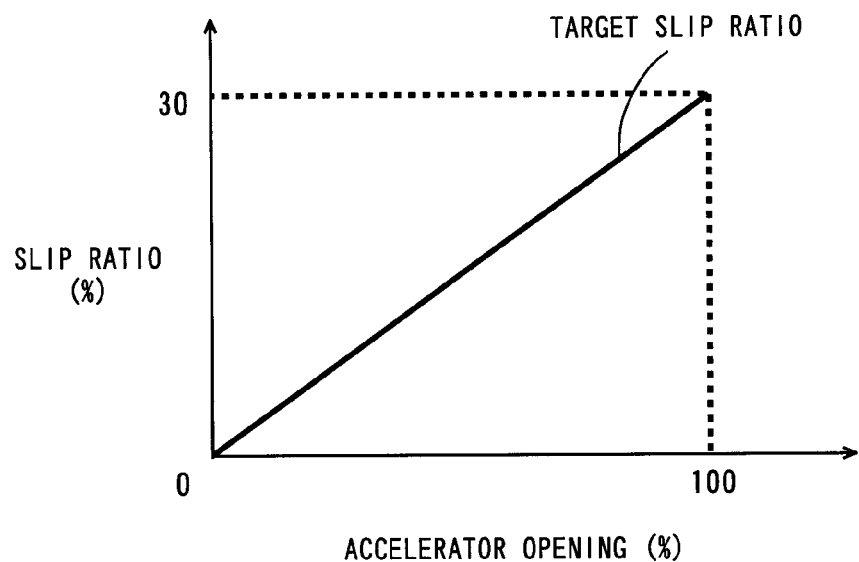
FIG. 11 is a diagram showing an example of target slip ratio data.

FIG. 11 shows an example of the target slip ratio data 514. In FIG. 11, the vertical axis indicates slip ratio, and the horizontal axis indicates accelerator opening. As shown in FIG. 11, the target slip ratio data 514 represents the relationship between the accelerator opening and the target slip ratio.

In the target slip ratio data 514 shown in FIG. 11, the target slip ratio linearly increases as the accelerator opening increases. In the slip ratio traction control, therefore, the driver can optionally adjust the actual slip ratio of the motorcycle 100 by adjusting the accelerator opening.

Although in the target slip ratio data 514 shown in FIG. 11, the upper limit of the target slip ratio is preferably set to about 30%, the upper limit of the target slip ratio can be adjusted by a setting panel, described later. The details will be described later.

The control flow of the slip ratio traction control will be described using the drawings.

Figure 12:
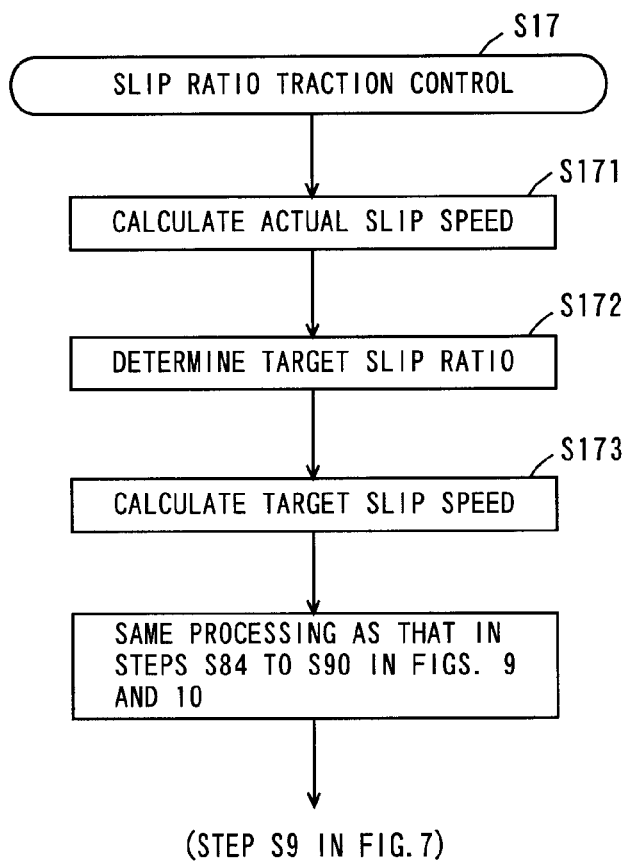
FIG. 12 is a flow chart showing an example of a control operation of an ECU in slip ratio traction control.

FIG. 12 is a flow chart showing an example of the control operation of the ECU 50 in the slip ratio traction control.

As shown in FIG. 12, in the slip ratio traction control, the ECU 50 first calculates the actual slip speed of the motorcycle 100 (step S171), as in the step S81 (FIG. 9). The ECU 50 then determines the target slip ratio on the basis of the detected value of the accelerator opening sensor SE2 (FIG. 2) and the target slip ratio data 514 (FIG. 11) (step S172).

The ECU 50 then calculates the target slip speed on the basis of the target slip ratio and the detected value of the front wheel speed sensor SE1 (FIG. 2) (step S173). Note that the target slip speed calculated in the step S173 is a slip speed in a case where the motorcycle 100 (the rear wheel 111) is slipped at the target slip ratio. In the step S173, the target slip speed is calculated by the following equation (5):

Target slip speed=target slip ratio×front wheel speed÷100 (5)

Thereafter, the ECU 50 performs the processing in the steps S84 to S90 shown in FIGS. 9 and 10. Thus, the torque outputted by the engine 107 (FIG. 2) (the traction of the rear wheel 111) is adjusted such that the actual slip ratio (the actual slip speed) follows the target slip ratio (the target slip speed). Thereafter, the ECU 50 proceeds to the step S9 shown in FIG. 7.

Examples of Control

We will explain how the rear wheel speed changes when the above-mentioned traction control is carried out with examples.

FIG. 13 is a diagram for explaining the relationship among the front wheel speed (vehicle speed), the threshold value of the slip speed, the target slip speed, the threshold value of the slip ratio, and the target slip ratio. In FIG. 13, the vertical axis indicates speed, and the horizontal axis indicates time.

FIG. 13 shows a case where the traction control is carried out using the slip speed threshold data 511 shown in FIG. 4, the slip ratio threshold data 512 shown in FIG. 5, the target slip speed data 513 shown in FIG. 8, and the target slip ratio data 514 shown in FIG. 11.

In the example shown in FIG. 13, it is assumed that the accelerator opening is fixed to about 50%. Consequently, the target slip speed determined from the target slip speed data 513 (FIG. 8) preferably is about 25 km/h, and the target slip ratio determined from the target slip ratio data 514 (FIG. 11) is about 15%. The threshold value of the vehicle speed in the step 4 (FIG. 6) is taken as about 10 km/h, for example.

In FIG. 13, a solid line A indicates the front wheel speed (vehicle speed). The vehicle speed rises at a predetermined acceleration, to reach approximately 10 km/h at a time point t2. Further, a one-dot and dash line B indicates a value obtained by adding the threshold value of the slip speed (FIG. 4) to the front wheel speed. That is, the difference between the value indicated by the one-dot and dash line B and the value indicated by the solid line A is the threshold value of the slip speed. Here, the actual slip speed is calculated by subtracting the front wheel speed from the rear wheel speed, as described above. In a region where the rear wheel speed takes a value greater than the value indicated by the one-dot and dash line B, therefore, the actual slip speed of the motorcycle 100 exceeds the threshold value of the slip speed (FIG. 4). The value indicated by the one-dot and dash line B will be hereinafter referred to as a first rear wheel speed threshold value.

Furthermore, a two-dots and dash line C indicates a value obtained by adding the product of the front wheel speed and the threshold value of the slip ratio (about 30%) to the front wheel speed. That is, the value indicated by the two-dots and dash line C is calculated by the following equation (6):

Value indicated by two-dots and dash line C=front wheel speed×threshold value of slip ratio+front wheel speed (6)

Here, the actual slip ratio is calculated by dividing the actual slip speed (the difference between the rear wheel speed and the front wheel speed) by the front wheel speed, as described above. In this case, the rear wheel speed is expressed by the following equation (7):

Rear wheel speed=front wheel speed×actual slip ratio+front wheel speed (7)

In a region where the rear wheel speed (see the equation (7)) takes a value greater than the value indicated by the two-dots and dash line C (see the equation (6)), therefore, the actual slip ratio of the motorcycle 100 exceeds the threshold value of the slip ratio (about 30%). The value indicated by the two-dots and dash line C will be hereinafter referred to as a second rear wheel speed threshold value.

A thick broken line D indicates a value obtained by adding the target slip speed (about 25 km/h) to the front wheel speed. That is, the difference between the value indicated by the broken line D and the value indicated by the solid line A is the target slip speed. Consequently, the target slip speed is less than the threshold value of the slip speed between a time point 0 and a time point t1 (the time when the solid line B and the broken line D cross each other), while being more than the threshold value of the slip speed between the time point t1 and the time point t2 (the time when the front wheel speed is about 10 km/h).

Here, when the target slip speed is not more than the threshold value of the slip speed in the slip speed traction control, as described in FIGS. 9 and 10, the ECU 50 adjusts the torque outputted by the engine 107 such that the actual slip speed follows the target slip speed. In the example shown in FIG. 13, therefore, the ECU 50 adjusts the torque outputted by the engine 107 such that the actual slip speed follows the target slip speed between the time point 0 and the time point t1. In this case, the rear wheel speed changes so as to follow the broken line D. The value indicated by the broken line D between the time point 0 and the time point t1 is hereinafter referred to as a first rear wheel speed target value E1. When the actual slip speed is more than the threshold value of the slip speed, as described above, the rear wheel speed is more than the value indicated by the one-dot and dash line B.

On the other hand, when the target slip speed is more than the threshold value of the slip speed, the ECU 50 adjusts the torque outputted by the engine 107 such that the actual slip speed follows the threshold value of the slip speed. In the example shown in FIG. 13, therefore, the ECU 50 adjusts the torque outputted by the engine 107 such that the actual slip speed follows the threshold value of the slip speed between the time point t1 and the time point t2. In this case, the rear wheel speed changes so as to follow the one-dot and dash line B. The value indicated by the one-dot and dash line B between the time point t1 and the time point t2 will be hereinafter referred to as a second rear wheel speed target value E2.

A thin broken line E3 indicates a value obtained by adding the product of the front wheel speed and the target slip ratio to the front wheel speed. That is, the broken line E3 indicates the rear wheel speed in a case where the motorcycle 100 (the rear wheel 111) slips at the target slip ratio. At the time point t2 and later, therefore, the ECU 50 adjusts the torque outputted by the engine 107 such that the rear wheel speed follows the broken line E3. The value indicated by the broken line E3 will be hereinafter referred to as a third rear wheel speed threshold value.

FIG. 14 is a diagram showing an example of the change in the rear wheel speed in a case where the front wheel speed, the threshold value of the slip speed, the target slip speed, the threshold value of the slip ratio, and the target slip ratio have the relationship shown in FIG. 13. In FIG. 14, a thick solid line F indicates the rear wheel speed. That is, the difference between the value indicated by the solid line F and the value indicated by the solid line A is the actual slip speed.

As shown in FIG. 14, the rear wheel speed rapidly rises immediately after the motorcycle 100 starts moving, and becomes higher than the first rear wheel speed threshold value B at the time point t0. That is, the actual slip speed is more than the threshold value of the slip speed at the time point t0, so that the slip speed traction control is started.

Here, at the time point t0, the actual slip speed rapidly increases. In this case, it is determined in the step S88 (FIG. 10) that the difference is more than the threshold value.

Therefore, at the time point t0, the ECU 50 proceeds to the step S90 (FIG. 10), to adjust the throttle opening of the ETV 82 as well as to retard the spark-ignition timing of the spark plug 78. This causes the rear wheel speed to quickly decrease toward the first rear wheel speed target value E1.

Thereafter, the ECU 50 adjusts the torque outputted by the engine 107 such that the actual slip speed follows the target slip speed between the time point t0 and the time point t1. Thus, the rear wheel speed changes so as to follow the first rear wheel speed target value E1 between the time point t0 and the time point t1.

Furthermore, the ECU 50 adjusts the torque outputted by the engine 107 such that the actual slip speed follows the threshold value of the slip speed between the time point t1 and the time point t2. Thus, the rear wheel speed changes so as to follow the second rear wheel speed target value E2 between the time point t1 and the time point t2.

At the time point t2, the vehicle speed is about 10 km/h, so that the slip ratio traction control is started. Thus, the ECU 50 adjusts the torque outputted by the engine 107 such that the actual slip ratio follows the target slip ratio (about 15%) at the time point t2 and later. At the time point t2 and later, therefore, the rear wheel speed changes so as to follow the third rear wheel speed target value E3.

Here, the reason why the torque outputted by the engine 107 is adjusted such that the actual slip speed follows not the target slip speed but the threshold value of the slip speed when the target slip speed exceeds the threshold value of the slip speed in the slip speed traction control will be described.

As shown in FIGS. 13 and 14, the value indicated by the broken line D at the time point t2 is about 35 km/h. That is, between the time point t1 and the time point t2, when the ECU 50 adjusts the torque outputted by the engine 107 such that the actual slip speed follows the target slip speed, the rear wheel speed at the time point t2 is approximately 35 km/h. Further, at the time point t2, the third rear wheel speed target value E3 is about 11.5 km/h. That is, at the time point t2, the output of the engine 107 is adjusted in order that the rear wheel speed will be about 11.5 km/h.

When the ECU 50 adjusts the torque outputted by the engine 107 such that the actual slip speed follows the target slip speed between the time point t1 and the time point t2, therefore, the rear wheel speed greatly decreases at the time point t2. Thus, the driver has an uncomfortable feeling.

In the present preferred embodiment, when the target slip speed exceeds the threshold value of the slip speed, therefore, the ECU 50 adjusts the torque outputted by the engine 107 such that the actual slip speed follows the threshold value of the slip speed (see in the step S91 and the subsequent steps in FIG. 9). Thus, the rear wheel speed is decelerated so as to follow the second rear wheel speed target value E2. Therefore, the rear wheel speed is prevented from greatly decreasing at the time point t2. As a result, the traveling performances of the motorcycle 100 are improved.

In this case, the actual slip speed gradually decreases, as shown in FIG. 14. That is, the front wheel speed and the rear wheel speed can be gradually brought closer to each other, which allows the traveling performances of the motorcycle 100 at the time of an intermediate or low speed to be sufficiently improved.

Although description was made of the case where the accelerator opening is about 50% in the examples shown in FIGS. 13 and 14, the value indicated by the broken line D and the value indicated by the broken line E3 increase or decrease depending on the accelerator opening.

FIG. 15 is a diagram showing the relationship among the front wheel speed (vehicle speed), the threshold value of the slip speed, the target slip speed, the threshold value of the slip ratio, and the target slip ratio in a case where the accelerator opening is fixed at about 70%. FIG. 16 is a diagram showing the relationship among the front wheel speed (vehicle speed), the threshold value of the slip speed, the target slip speed, the threshold value of the slip ratio, and the target slip ratio in a case where the accelerator opening is fixed at about 20%.

When the accelerator opening is fixed at about 70%, the target slip speed determined from the target slip speed data 513 (FIG. 8) is about 35 km/h, so that the value indicated by the broken line D increases, as shown in FIG. 15, as compared with that shown in FIG. 13. That is, the first rear wheel speed target value E1 increases.

On the other hand, when the accelerator opening is fixed to about 20%, the target slip speed determined from the target slip speed data 513 (FIG. 8) is about 10 km/h, so that the value indicated by the broken line D decreases, as shown in FIG. 16, as compared with that shown in FIG. 13. That is, the first rear wheel speed target value E1 decreases.

Therefore, in the present preferred embodiment, the driver can adjust the first rear wheel speed target value E1 by adjusting the accelerator opening. That is, in the slip speed traction control, the driver can optionally adjust the actual slip speed and the rear wheel speed by adjusting the accelerator opening.

Furthermore, when the accelerator opening is fixed at about 70%, the target slip ratio determined from the target slip ratio data 514 (FIG. 11) is about 21%, so that the slope of the broken line E3 becomes greater than that shown in FIG. 13, as shown in FIG. 15. That is, the rate of increase of the third rear wheel speed target value E3 to the amount of increase in the vehicle speed (front wheel speed) increases.

On the other hand, when the accelerator opening is fixed at about 20%, the target slip ratio determined from the target slip ratio data 514 (FIG. 11) is about 6%, so that the slope of the broken line E3 becomes less than that shown in FIG. 13, as shown in FIG. 16. That is, the rate of increase of the third rear wheel speed target value E3 to the amount of increase in the vehicle speed (front wheel speed) decreases.

In the present preferred embodiment, the driver can thus adjust the slope of the third rear wheel speed target value E3 by adjusting the accelerator opening. That is, in the slip ratio traction control, the driver can optionally adjust the actual slip ratio and the rear wheel speed by adjusting the accelerator opening.

Note that the one-dot and dash line B and the broken line D cross each other at a time point t3 between the time point 0 and the time point t1 in FIG. 15, and cross at a time point t4 between the time point t1 and the time point t2 in FIG. 16.

That is, when the driver increases the accelerator opening, a time period during which the ECU 50 adjusts the torque outputted by the engine 107 on the basis of the target slip speed is shortened in the slip speed traction control. On the other hand, when the driver decreases the accelerator opening, the time period during which the ECU 50 adjusts the torque outputted by the engine 107 on the basis of the target slip speed is increased in the slip speed traction control.

It is preferable that in the slip speed traction control and the slip ratio traction control, the torque outputted by the engine 107 is not set to not more than zero. In this case, a braking force (an engine brake) is prevented from being applied to the rear wheel 111 at the time of the traction control, so that the traveling performances of the motorcycle 100 are improved.

Method of Setting Upper Limit

As described in the foregoing, the threshold value of the slip speed threshold data 511 (FIG. 4), the threshold value of the slip ratio threshold data 512 (FIG. 5), the upper limit of the target slip speed in the target slip speed data 513 (FIG. 8), and the upper limit of the target slip ratio in the target slip ratio data 514 (FIG. 11) can be set by a setting panel. The setting panel can be provided in the handle 105 (FIG. 1), for example.

Figure 17:
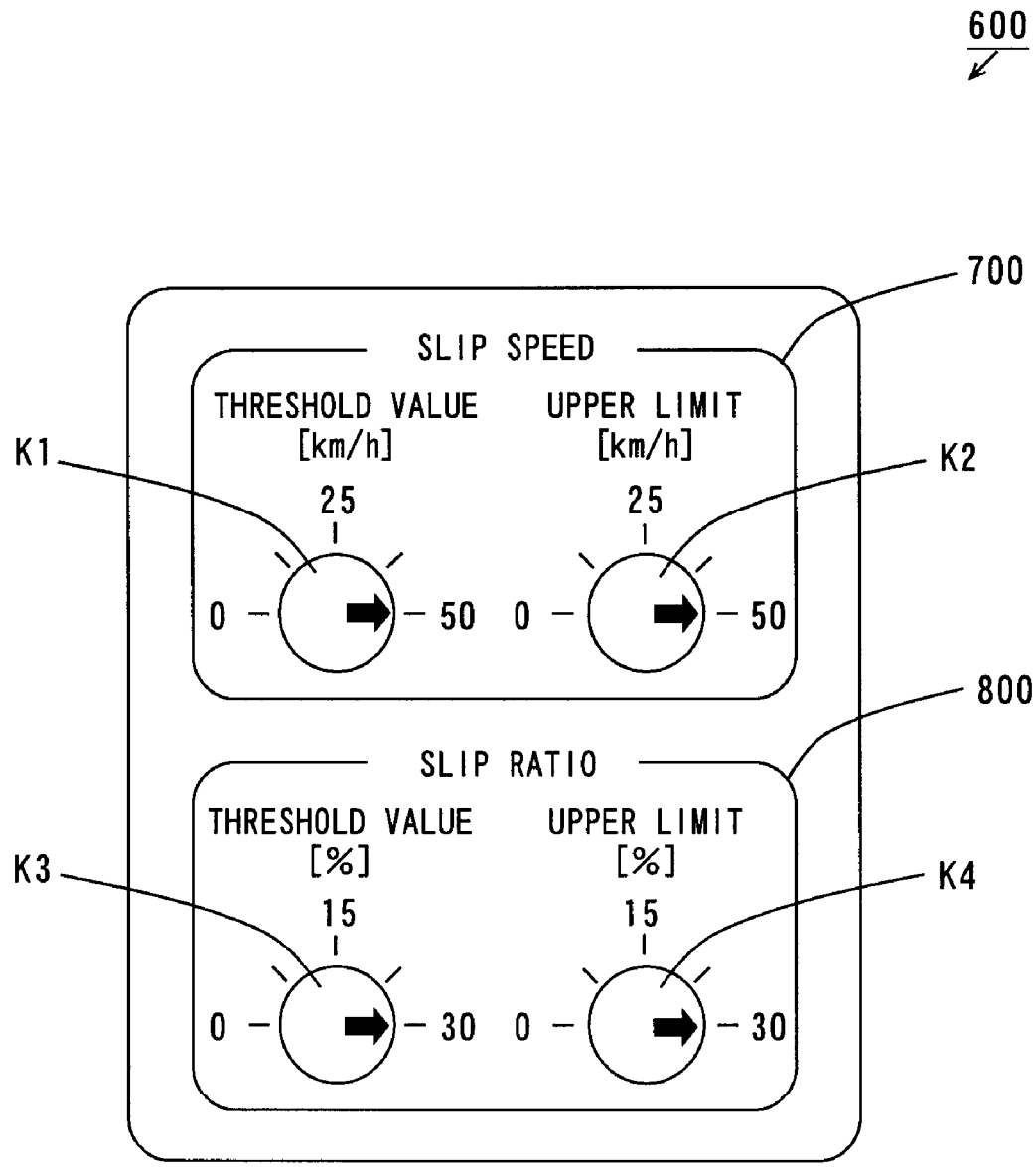
FIG. 17 is a diagram showing an example of a setting panel.

FIG. 17 is a diagram showing an example of the setting panel.

A setting panel 600 shown in FIG. 17 includes a slip speed setter 700 and a slip ratio setter 800. The slip speed setter 700 includes adjustment knobs K1 and K2, and the slip ratio setter 800 includes adjustment knobs K3 and K4. The adjustment knobs K1 to K4 are respectively assigned arrows. The driver makes adjustment described below by respectively adjusting the arrows to desired positions.

Adjustment of Threshold Value of Slip Speed

The adjustment knob K1 is rotatably provided in the slip speed setter 700. The driver can adjust the threshold value of the slip speed threshold data 511 (FIG. 4) stored in the storage device 51 (FIG. 3) by rotating the adjustment knob K1. Note that the value adjusted by the adjustment knob K1 is the threshold value of the slip speed with the vehicle speed of 0 km/h.

In FIG. 17, the arrow assigned to the adjustment knob K1 points to 50. In this case, in the slip speed threshold data 511, the threshold value of the slip speed with the vehicle speed of 0 km/h is preferably set to about 50 km/h, as shown in FIG. 4. Further, when the driver rotates the adjustment knob K1 such that the arrow assigned to the adjustment knob K1 points to 25, for example, the threshold value of the slip speed with the vehicle speed of 0 km/h is preferably set to about 25 Km/h in the slip speed threshold data 511.

In the present preferred embodiment, the driver can thus optionally adjust the threshold value of the slip speed by rotating the adjustment knob K1. Consequently, the driver can adjust the threshold value of the slip speed in consideration of conditions such as road surface conditions and weather conditions. This allows the driver to enjoy comfortable traveling of the motorcycle 100.

It is preferable that the threshold value of the slip speed with the vehicle speed of 0 km/h is set to not less than about 20 km/h, for example. When the motorcycle 100 starts moving, the rear wheel speed more rapidly increases, as compared with the front wheel speed, as shown in FIG. 14. When the threshold value of the slip speed is set to a low value in an ultra-low speed region, therefore, the traction control is carried out at nearly the same time that the motorcycle 100 starts moving. In this case, control for reducing the torque outputted by the engine 107 is carried out at nearly the same time that the motorcycle 100 starts moving, so that the engine 107 may, in some cases, be stopped.

On the other hand, when the threshold value of the slip speed is set to a high value in the ultra-low speed region, control for reducing the torque outputted by the engine 107 is not carried out until the rear wheel speed reaches a sufficient speed. Consequently, the torque outputted by the engine 107 can be prevented from being reduced at nearly the same time that the motorcycle 100 starts moving. This can prevent the engine 107 from being stopped.

The threshold value of the slip speed in the vehicle speed (see the step S4 shown in FIG. 6) at which the slip speed traction control and the slip ratio traction control are switched is determined by the following equation (8):

$$\text{Threshold value} = \text{vehicle speed} \times \text{threshold value of slip ratio} \quad (8)$$

In the example shown in FIG. 5, the vehicle speed at which the above-mentioned switching is performed is about 10 km/h, and the threshold value of the slip ratio is preferably about 30%. In this case, the threshold value of the slip speed with the vehicle speed of about 10 km/h is preferably about 3 km/h, as shown in FIG. 4.

Adjustment of Target Slip Speed

As shown in FIG. 17, the adjustment knob K2 is rotatably provided in the slip speed setter 700. The driver can adjust the upper limit of the target slip speed in the target slip speed data 513 (FIG. 8) stored in the storage device 51 (FIG. 3) by rotating the adjustment knob K2.

In FIG. 17, the arrow assigned to the adjustment knob K2 points to 50. In this case, the upper limit of the target slip speed is set to about 50 km/h, as shown in FIG. 8. That is, in the example shown in FIG. 8, the driver can adjust the target slip speed between about 0 km/h and about 50 km/h.

Figure 18:
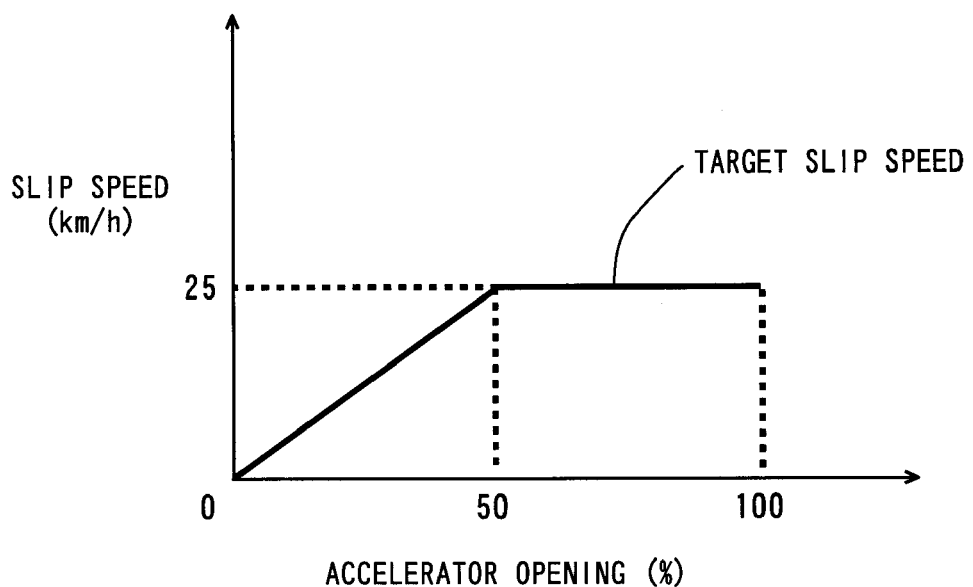
FIG. 18 is a diagram showing another example of target slip speed data.

FIG. 18 is a diagram showing another example of the target slip speed data 513. FIG. 18 shows a case where the driver rotates the adjustment knob K2 such that the arrow assigned to the adjustment knob K2 (FIG. 17) points to 25.

When the arrow assigned to the adjustment knob K2 points to 25, as shown in FIG. 18, the target slip speed has its upper limit limited to about 25 km/h while maintaining the slope shown in FIG. 8. In a region where the accelerator opening is not less than about 50%, therefore, the target slip speed is preferably fixed to about 25 km/h.

That is, in the example shown in FIG. 18, the driver can optionally adjust the target slip speed between about 0 km/h and about 25 km/h. When the driver erroneously fully opens the accelerator opening, the target slip speed is prevented from being not less than about 25 km/h, which can prevent the motorcycle 100 (the rear wheel 111) from rapidly slipping.

In the present preferred embodiment, the driver can thus optionally adjust the upper limit of the target slip speed by rotating the adjustment knob K2. Consequently, the driver can adjust the upper limit of the target slip speed in consideration of conditions such as road surface conditions and weather conditions. This allows the driver to enjoy comfortable traveling of the motorcycle 100.

Adjustment of Threshold Value of Slip Ratio

As shown in FIG. 17, the adjustment knob K3 is rotatably provided in the slip ratio setter 800. The driver can adjust the threshold value of the slip ratio in the slip ratio threshold data 512 (FIG. 5) stored in the storage device 51 (FIG. 3) by rotating adjustment knob K3.

In FIG. 17, the arrow assigned to the adjustment knob K3 points to 30. In this case, in the slip ratio threshold data 512, the threshold value of the slip ratio is set to about 30%, as shown in FIG. 5. Further, when the driver rotates the adjustment knob K3 such that the arrow assigned to the adjustment knob K3 points to 15, for example, the threshold value of the slip ratio is set to about 15% in the slip ratio threshold data 512.

In the present preferred embodiment, the driver can thus optionally adjust the threshold value of the slip ratio by rotating the adjustment knob K3. Consequently, the driver can adjust the threshold value of the slip ratio in consideration of conditions such as road surface conditions and weather conditions. This allows the driver to enjoy comfortable traveling of the motorcycle 100.

Adjustment of Target Slip Ratio

As shown in FIG. 17, the adjustment knob K4 is rotatably provided in the slip ratio setter 800. The driver can adjust the upper limit of the target slip ratio in the target slip ratio data 514 (FIG. 11) stored in the storage device 51 (FIG. 3) by rotating adjustment knob K4.

In FIG. 17, the arrow assigned to the adjustment knob K4 points to 30. In this case, the upper limit of the target slip ratio is set to about 30%, as shown in FIG. 11. That is, in the example shown in FIG. 11, the driver can adjust the target slip ratio between about 0% and about 30% by adjusting the accelerator opening.

Figure 19:
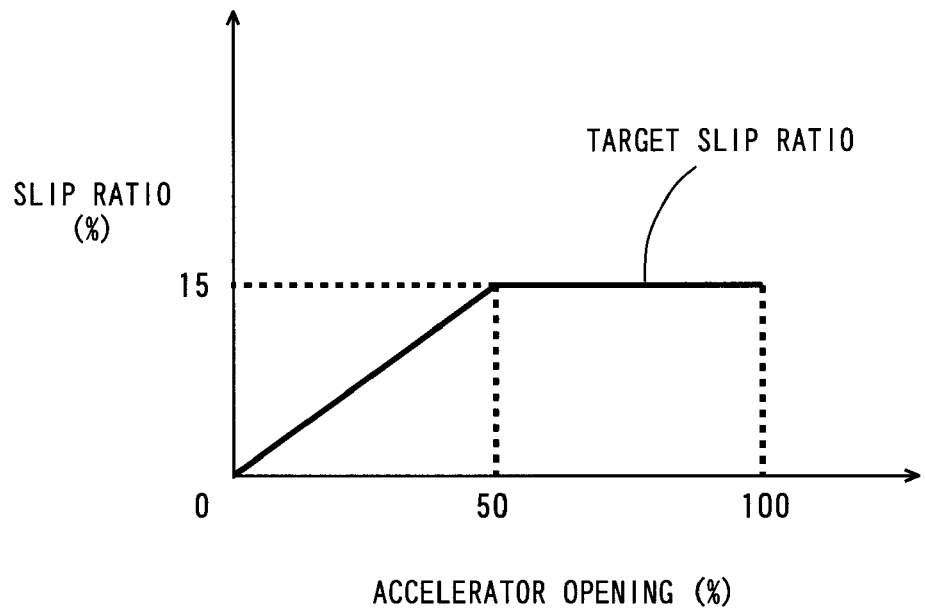
FIG. 19 is a diagram showing another example of target slip ratio data.

FIG. 19 is a diagram showing another example of the target slip ratio data 514. FIG. 19 shows a case where the driver rotates the adjustment knob K4 such that the arrow assigned to the adjustment knob K4 (FIG. 17) points to 15.

When the arrow assigned to the adjustment knob K4 points to 15, as shown in FIG. 19, the target slip ratio has its upper limit limited to about 15% while maintaining the slope shown in FIG. 11. In a region where the accelerator opening is not less than about 50%, therefore, the target slip ratio is fixed to about 15%.

That is, in the example shown in FIG. 19, the driver can optionally adjust the target slip ratio between about 0% and about 15%. When the driver erroneously fully opens the accelerator opening, the target slip ratio is prevented from being not less than about 15%, which can prevent the motorcycle 100 (the rear wheel 111) from greatly slipping.

In the present preferred embodiment, the driver can thus optionally adjust the upper limit of the target slip ratio by rotating the adjustment knob K4. Consequently, the driver can adjust the upper limit of the target slip ratio in consideration of conditions such as road surface conditions and weather conditions. This allows the driver to enjoy comfortable traveling of the motorcycle 100.

On a paved road surface, for example, it is preferable that the upper limit of the target slip ratio is set to about 5% to about 10%. In this case, the motorcycle 100 can be easily accelerated, and a grip force in a transverse direction of a tire of the rear wheel 111 can be sufficiently ensured. This causes the operability of the motorcycle 100 to be improved.

Effects of Present Preferred Embodiment

As described in the foregoing, in the present preferred embodiment, the torque outputted by the engine 107 is adjusted such that the actual slip speed follows the target slip speed by the speed ratio traction control at the time of a low speed.

Here, the reason why the torque outputted by the engine 107 is adjusted such that the actual slip speed follows the target slip speed at the time of a low speed will be described.

When the motorcycle 100 starts moving, the rear wheel speed rapidly rises, while the front wheel speed hardly rises. That is, when the motorcycle 100 starts moving, the rear wheel 111 is rotated with the front wheel 104 almost stopped.

In such a state, the actual slip ratio calculated by the foregoing equation (4) varies at a significantly high value. When the rear wheel speed is about 3 km/h and the front wheel speed is about 0.1 km/h, for example, the actual slip ratio is approximately 2900%. When the rear wheel speed is about 4 km/h and the front wheel speed is about 0.1 km/h, the actual slip ratio is approximately 3900%.

Thus, the actual slip ratio significantly changes by a slight change in the rear wheel speed at the time of a low speed. Therefore, it is difficult to determine the most suitable target slip ratio in a low-speed state.

Furthermore, when the engine 107 is controlled such that the actual slip ratio follows the target slip ratio in a low-speed state, the variation width of the rear wheel speed increases. Therefore, the driver has an uncomfortable feeling.

Furthermore, the actual slip ratio significantly changes by a slight change in the rear wheel speed at the time of a low speed, as described above. When the actual slip ratio follows the target slip ratio at the time of a low speed, therefore, the driver cannot easily estimate the actual slip speed and the rear wheel speed from the magnitude of the accelerator opening. Therefore, the drivability of the motorcycle 100 is deteriorated.

In order to solve the foregoing problems, in the present preferred embodiment, the traction control is carried out such that the actual slip speed follows the target slip speed at the time of a low speed. In this case, the driver can easily determine the most suitable target slip speed. This causes the operability of the motorcycle 100 to be improved.

Since the variation in the rear wheel speed can be reduced at the time of a low speed, the vehicle speed of the motorcycle 100 can be stabilized. This can prevent the driver from having an uncomfortable feeling at the time of a low speed.

Furthermore, the driver can easily estimate the rear wheel speed and the actual slip speed on the basis of the magnitude of the accelerator opening. This allows the drivability of the motorcycle 100 to be sufficiently improved.

In the present preferred embodiment, the torque outputted by the engine 107 is adjusted such that the actual slip ratio follows the target slip ratio by the slip ratio traction control at the time of an intermediate or high speed. Here, when the vehicle speed is an intermediate or high speed, the most suitable actual slip ratio of the rear wheel 111 is determined depending on road surface conditions. Consequently, the target slip ratio is set to the most suitable value depending on road surface conditions during traveling, which allows the motorcycle 100 to be easily accelerated and allows the grip force in the transverse direction of the rear wheel 111 to be sufficiently ensured. As a result, the operability of the motorcycle 100 can be improved.

As a result of the foregoing, it is possible to carry out the traction control suitable for the speed of the vehicle.

In the present preferred embodiment, the target slip speed is adjusted depending on the accelerator opening by the slip speed traction control at the time of a low speed. Consequently, the driver can adjust the actual slip speed by adjusting the accelerator opening at the time of a low speed.

Furthermore, the target slip ratio is adjusted depending on the acceleration opening by the slip ratio traction control at the time of an intermediate or high speed. Consequently, the driver can adjust the actual slip ratio by adjusting the accelerator opening at the time of an intermediate or high speed.

In the present preferred embodiment, the driver can thus optionally adjust the actual slip speed and the actual slip ratio while sliding the rear wheel 111 according to his or her intention. This allows the driver to enjoy comfortable traveling of the motorcycle 100.

When the driver intentionally slides the rear wheel 111 (at the time of drift traveling), the grip force of the rear wheel 111 can be prevented from being recovered contrary to the intention of the driver. This causes the operability of the motorcycle 100 to be improved.

Furthermore, the driver can slide the rear wheel 111 at the actual slip ratio to the road surface conditions by adjusting the accelerator opening at the time of an intermediate or high speed. This allows the motorcycle 100 to be easily accelerated and allows the grip force in the transverse direction of the tire of the rear wheel 111 to be sufficiently ensured. As a result, the operability of the motorcycle 100 can be improved.

In the present preferred embodiment, the traction control is started when the actual slip speed exceeds the threshold value of the slip speed at the time of a low speed.

Here, the actual slip ratio of the rear wheel 111 varies at a significantly high value when the vehicle speed is a low speed (e.g., when the motorcycle 100 starts moving), as described above. Further, the actual slip ratio significantly changes by a slight change in the rear wheel speed. Therefore, it is difficult to determine the most suitable actual slip ratio in a low-speed state.

This problem can be solved by the control system 200 according to the present preferred embodiment. In the present preferred embodiment, it is determined whether or not the traction control is carried out on the basis of the threshold value of the slip speed in a low-speed state. Here, the most suitable actual slip speed can be easily determined when the vehicle speed is a low speed. Consequently, the slip speed traction control can be started at the suitable point in time by determining the threshold value of the slip speed on the basis of the most suitable actual slip speed.

The traction control is started when the actual slip ratio exceeds the threshold value of the slip ratio at the time of an intermediate or high speed.

Here, the most suitable actual slip ratio of the rear wheel 111 is determined depending on road surface conditions at an intermediate or high speed. Consequently, the slip ratio traction control can be started at the suitable point in time by setting the threshold value of the slip ratio to the most suitable value depending on road surface conditions during traveling.

As a result of the foregoing, it is possible to reliably carry out the traction control suitable for the vehicle speed. When the motorcycle 100 greatly slips irrespective of the vehicle speed, the traction control of the rear wheel 111 is quickly carried out. This allows the motorcycle 100 to be easily stabilized.

In the slip speed traction control, the torque outputted by the engine 107 is adjusted such that the actual slip speed follows the target slip speed by feedback control using the PID controller 52. Further, in the slip ratio traction control, the torque outputted by the engine 107 is adjusted such that the actual slip ratio follows the target slip ratio by the feedback control using the PID controller 52.

In the present preferred embodiment, the torque outputted by the engine 107 is thus adjusted such that the actual slip speed or the actual slip ratio follows the target slip speed or the target slip ratio. This can prevent the differences from respectively occurring between the actual slip speed and the actual slip ratio of the motorcycle 100 and the target slip speed and the target slip ratio required by the driver. When the rear wheel 111 excessively recovers its grip force, for example, the torque outputted by the engine 107 is adjusted such that the grip force of the rear wheel 111 is reduced. This allows the driver to enjoy more comfortable traveling.

In the present preferred embodiment, the respective upper limits of the target slip speed and the target slip ratio can be adjusted. Consequently, the driver can adjust the target slip speed and the target slip ratio in consideration of various elements such as a level of skill, road surface conditions, and weather conditions. This allows the operability of the motorcycle to be sufficiently improved.

Furthermore, the driver can easily estimate the slip speed and the slip ratio of the motorcycle 100 by adjusting the upper limits. This causes the operability of the motorcycle 100 to be further improved.

In the present preferred embodiment, when the switch button of the switch SW (see FIGS. 1 and 2) is not pressed (see step S1 in FIG. 4), the traction control of the rear wheel 111 is not carried out. Consequently, the driver can optionally choose whether or not the traction control of the rear wheel 111 is carried out by operating the switch SW. In this case, the driver can operate the switch SW in consideration of various elements such as a level of skill, road surface conditions, and weather conditions. This causes the operability of the motorcycle 100 to be further improved.

In the present preferred embodiment, when the state of the motorcycle 100 satisfies the traction control terminating conditions, the traction control is stopped.

Specifically, when the actual slip speed (actual slip ratio) is less than the target slip speed (target slip ratio) and the target throttle opening is greater than the accelerator opening (%) during the traction control, the traction control is stopped.

Here, when the actual slip speed (actual slip ratio) is less than the target slip speed (target slip ratio), it is considered that the rear wheel 111 has a certain grip force. In the state, when the target throttle opening is greater than the accelerator opening, it is considered that the traveling state of the motorcycle 100 comes close to a normal traveling state. In such a case, therefore, the traction control by the ECU 50 is stopped, and the normal control is carried out. This allows the operability of the motorcycle 100 to be further improved.

Furthermore, when the rotational speed of the engine 107 is less than a predetermined threshold value during the traction control, the traction control is stopped. Here, when the motorcycle 100 starts moving on a sloping road or the like, a high load is applied to the engine 107. This causes the rotational speed of the engine 107 to be reduced. When the throttle opening is reduced by the traction control in such a state, an output of the engine 107 is reduced, so that the engine 107 may, in some cases, be stopped. Therefore, in such a case, the traction control by the ECU 50 is stopped, and the normal control is carried out. This allows the operability of the motorcycle 100 to be further improved.

In the present preferred embodiment, the traction control is carried out using the slip speed threshold data 511, the slip ratio threshold data 512, the target slip speed data 513, the target slip ratio data 514, and the target throttle opening map 515. In this case, target numerical values can be easily calculated, so that a time period required for processing by the ECU 50 can be shortened. This allows the traction control of the motorcycle 100 to be quickly carried out, resulting in further improved traveling performances.

In the present preferred embodiment, the threshold value of the slip speed is so set as to decrease as the vehicle speed increases. This allows the traction control suitable for the vehicle speed to be carried out. As a result, the drivability of the motorcycle 100 can be reliably improved.

Other Preferred Embodiments

Detection of Vehicle Speed

Although description was made of a case where the vehicle speed is detected on the basis of the detected value of the front wheel speed sensor SE1, the vehicle speed of a motorcycle 100 may be detected using a speed detection sensor utilizing a GPS (Global Positioning System). Furthermore, an acceleration sensor may be provided in the motorcycle 100, and the acceleration sensor may detect the acceleration of the motorcycle 100. In this case, the ECU 50 can calculate the vehicle speed of the motorcycle 100 by integrating the acceleration detected by the acceleration sensor. Note that, an example of a calculating system for calculating vehicle speed is described in U.S. patent application Ser. No. 11/682,017, the full disclosure of which is hereby incorporated herein by reference.

Adjustment of Torque Outputted By Engine

Although in the steps S89 and S90 shown in FIG. 10, the torque outputted by an engine 107 is adjusted by adjusting the throttle opening of an ETV 82, the torque outputted by the engine 107 may be adjusted by stopping the ignition of an air-fuel mixture or the supply of a fuel, for example.

Although in the foregoing step S90, the torque outputted by the engine 107 is reduced by retarding the spark-ignition timing, the torque outputted by the engine 107 may be reduced by another method. For example, the torque outputted by the engine 107 may be reduced by performing spark ignition when a piston 72 (FIG. 2) is positioned at an upper dead point. In this case, the torque outputted by the engine 107 can be easily and reliably reduced.

Calculation of Actual Slip Ratio

An actual slip ratio may be calculated by the following equation (9):

$$\text{Actual slip ratio} = \text{actual slip speed} \div \text{rear wheel speed} \times 100 \quad (9)$$

In this case, a target slip speed in the step S173 (FIG. 12) is calculated by the following equation (10):

$$\text{Target slip speed} = \text{target slip ratio} \div \text{rear wheel speed} \div 100 \quad (10)$$

Calculation of Threshold Value, Target Slip Speed, Target Slip Ratio, and Target Throttle Opening The slip speed threshold data 511 may be replaced with a function representing the relationship between a threshold value of a slip speed and a vehicle speed, and the slip ratio threshold data 512 may be replaced with a function representing the relationship between a threshold value of a slip ratio and a vehicle speed.

The target slip speed data 513 may be replaced with a function representing the relationship between a target slip speed and a vehicle speed, and the target slip ratio data 514 may be replaced with a function representing the relationship between a target slip ratio and a vehicle speed.

Furthermore, the target throttle opening map 515 may be replaced with a function representing the rotational speed of the engine 107, the throttle opening of the ETV 82, and the torque outputted by the engine 107.

Setting Panel

Although description was made of the setting panel 600 including the four adjustment knobs K1 to K4, the setting panel may have another configuration.

FIG. 20 is a diagram showing another example of the setting panel.

A setting panel 601 shown in FIG. 20 differs from the setting panel 600 shown in FIG. 17 in the following points.

The setting panel 601 shown in FIG. 20 includes a slip speed setter 701 and a slip ratio setter 801. The slip speed setter 701 includes an adjustment button B1, a threshold value display D1, an adjustment button B2, an adjustment knob K2, and a maximum value display D2. Further, the slip ratio setter 801 includes an adjustment button B3, a threshold value display D3, an adjustment button B4, an adjustment knob K4, and a maximum value display D4.

The threshold value of the slip speed is displayed on the threshold value display D1. A driver can adjust the threshold value of the slip speed displayed on the threshold value display D1 by operating the adjustment button B1.

The maximum value of the upper limit of target slip speed is displayed on the maximum value display D2. The driver can adjust the maximum value of the upper limit of the target slip speed by operating the adjustment button B2. When the driver operates the adjustment button B2 to set a value displayed on the maximum value display D2 to 30, for example, the maximum value of the target slip speed in the target slip speed data 513 shown in FIG. 8 (a target slip speed with the accelerator opening of 100%) is about 30 km/h.

That is, the driver can adjust the slope of the target slip speed shown in FIG. 8 by operating the adjustment button B2. This allows the operability of the motorcycle 100 to be further improved. Not that the upper limit of the slip speed is adjusted using the adjustment knob K2, as in the setting panel 600.

The threshold value of the slip ratio is displayed on the threshold value display D3. The driver can adjust the threshold value of the slip ratio displayed on the threshold value display D2 by operating the adjustment button B3.

The maximum value of the upper limit of the target slip ratio is displayed on the maximum value display D4. The driver can adjust the maximum value of the upper limit of the target slip ratio by operating the adjustment button B4. When the driver operates the adjustment button B4 to set a value displayed on the maximum value display D4 to 15, for example, the maximum value of the target slip ratio in the target slip ratio data 514 shown in FIG. 11 (a target slip ratio with the accelerator opening of 100%) is about 15%.

That is, the driver can adjust the slope of the target slip ratio shown in FIG. 11 by operating the adjustment button B4. This allows the operability of the motorcycle 100 to be further improved. The upper limit of the slip ratio is adjusted using the adjustment knob K4, as in the setting panel 600.

Application to Another Vehicle

Although description was made of the motorcycle 100 including the control system 200, the control system 200 may be provided in other vehicles such as a three-wheel motor vehicle and a four-wheel motor vehicle. In this case, the accelerator grip 106 may be replaced with another accelerator such as an accelerator pedal to adjust a target slip speed and a target slip ratio.

Correspondence Between Elements in the Claims and Elements in Preferred Embodiments In the following two paragraphs, non-limiting examples of correspondences between various elements recited in the claims below and those described above with respect to various preferred embodiments of the present invention are explained.

In the preferred embodiments described above, the rear wheel 111 is an example of a drive wheel, the ECU 50 is an example of a slip speed detector, a slip ratio detector, and an engine output adjuster, the actual slip speed is an example of a slip speed, the actual slip ratio is an example of a slip ratio, the slip speed traction control is an example of first traction control, the slip ratio traction control is an example of second traction control, a threshold value of a slip speed is an example of a first threshold value, a threshold value of a slip ratio is an example of a second threshold value, an accelerator grip 106 is an example of an accelerator, the ECU 50 is an example of a target slip amount setter, the setting panels 600 and 601 are examples of an upper limit setter, the ETV 82 is an example of a throttle valve, the engine rotational speed sensor SE3 is an example of an engine rotational speed detector, the target throttle opening map 515 is an example of information, a function representing the relationship among the rotational speed of the engine 107, the throttle opening of the ETV 82, and the torque outputted by the engine 107 is an example of information, the switch SW is an example of an operation switch, and the rear wheel driven sprocket 112, the drive shaft 115, the rear wheel drive sprocket 116, and the chain 117 are examples of a driving force transmission mechanism.

As each of various elements recited in the claims, various other elements having configurations or functions described in the claims can be also used.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A control system that carries out, in a vehicle comprising a drive wheel and an engine, traction control of said drive wheel, the control system comprising:
    a slip speed detector that detects a slip speed obtained from a difference between a peripheral speed of said drive wheel and a vehicle body speed of said vehicle;
    a slip ratio detector that detects a slip ratio obtained from a ratio of said slip speed to the peripheral speed of said drive wheel or said vehicle body speed; and
    an engine output adjuster that adjusts an output of said engine; wherein
    said engine output adjuster carries out first traction control so as to adjust the output of said engine depending on the slip speed detected by said slip speed detector when said vehicle body speed is not more than a predetermined speed, and carries out second traction control so as to adjust the output of said engine depending on the slip ratio detected by said slip ratio detector when said vehicle body speed is more than the predetermined speed.

2. The control system according to claim 1, wherein said engine output adjuster adjusts the output of said engine such that the slip speed detected by said slip speed detector follows a target slip speed in said first traction control, and adjusts the output of said engine such that the slip ratio detected by said slip ratio detector follows a target slip ratio in said second traction control.

3. The control system according to claim 2, wherein said engine output adjuster starts said first or second traction control at the earlier of a point in time when the slip speed detected by said slip speed detector first exceeds a first threshold value after the engine output adjuster is operated and when said vehicle body speed is not more than the predetermined speed, and at a point in time when the slip ratio detected by said slip ratio detector first exceeds a second threshold value after said engine output adjuster is operated and when said vehicle body speed is more than said predetermined speed.

4. The control system according to claim 3, wherein said first threshold value changes depending on said vehicle body speed so as to reach its maximum when said vehicle body speed is zero.

5. The control system according to claim 4, wherein said first threshold value decreases as said vehicle body speed increases.

6. The control system according to claim 5, wherein said engine output adjuster adjusts the output of said engine such that the slip speed detected by said slip speed detector follows said first threshold value when said target slip speed is more than said first threshold value in said first traction control.

7. The control system according to claim 2, further comprising a target slip amount setter that sets the slip speed and the slip ratio that are determined depending on a manipulated variable of an accelerator by a driver, respectively, as said target slip speed and said target slip ratio.

8. The control system according to claim 7, further comprising an upper limit setter that sets the respective upper limits of said target slip speed and said target slip ratio that can be set by said target slip amount setter.

9. The control system according to claim 1, further comprising a throttle valve that adjusts the amount of air supplied to said engine, an engine rotational speed detector that detects the rotational speed of said engine, and a storage device that stores information representing the relationship among the rotational speed of said engine, the output of said engine, and the opening of said throttle valve, wherein said engine output adjuster adjusts the output of said engine by adjusting the opening of said throttle valve on the basis of the rotational speed detected by said engine rotational speed detector and said information stored in said storage device.

10. The control system according to claim 1, further comprising an operation switch for activating said engine output adjuster.

11. The control system according to claim 1, wherein said engine output adjuster does not set a torque outputted by said engine to not more than zero in said first and second traction control.

12. A control system that carries out, in a vehicle comprising a drive wheel and an engine, traction control of said drive wheel, comprising:
- a slip speed detector that detects a slip speed obtained from a difference between a peripheral speed of said drive wheel and a vehicle body speed of said vehicle;
- a slip ratio detector that detects a slip ratio obtained from a ratio of said slip speed to the peripheral speed of said drive wheel or said vehicle body speed; and
- an engine output adjuster that adjusts an output of said engine depending on said slip speed or said slip ratio of said drive wheel; wherein
- said engine output adjuster starts said traction control at the earlier of a point in time when the slip speed detected by said slip speed detector first exceeds a first threshold value after the engine output adjuster is operated and when said vehicle body speed is not more than a predetermined speed, and at a point in time when the slip ratio detected by said slip ratio detector first exceeds a second threshold value after said engine output adjuster is operated and when said vehicle body speed is more than said predetermined speed.

13. A vehicle comprising:
- a drive wheel;
- an engine that produces a driving force to rotate said drive wheel;
- a driving force transmitter arranged to transmit the driving force produced by said engine to said drive wheel; and
- a control system that carries out traction control of said drive wheel; wherein
- said control system includes:
- a slip speed detector that detects a slip speed obtained from a difference between a peripheral speed of said drive wheel and a vehicle body speed of said vehicle;
- a slip ratio detector that detects a slip ratio obtained from a ratio of said slip speed to the peripheral speed of said drive wheel or said vehicle body speed; and
- an engine output adjuster that adjusts an output of said engine,
- wherein said engine output adjuster
- carries out first traction control so as to adjust the output of said engine depending on the slip speed detected by said slip speed detector when said vehicle body speed is not more than a predetermined speed, and
- carries out second traction control so as to adjust the output of said engine depending on the slip ratio detected by said slip ratio detector when said vehicle body speed is more than the predetermined speed.

* * * * *